United States Patent [19]

Fleischer, III

[11] Patent Number: 5,878,127
[45] Date of Patent: Mar. 2, 1999

[54] METHOD AND APPARATUS FOR FACILITATING REMOTE COMMUNICATIONS ACCESS TO MULTIPLE LOCATIONS WITHIN A TELECOMMUNICATIONS NETWORK

[75] Inventor: Harold C. Fleischer, III, St. Louis, Mo.

[73] Assignee: SBC Technology Resources, Inc., Austin, Tex.

[21] Appl. No.: 723,243

[22] Filed: Sep. 30, 1996

[51] Int. Cl.[6] .................................................. H04M 3/42
[52] U.S. Cl. ........................ 379/220; 379/220; 379/196
[58] Field of Search .................................. 379/201, 207, 379/220, 221, 93.02, 196, 197, 142

[56] References Cited

U.S. PATENT DOCUMENTS

| | | |
|---|---|---|
| 4,191,860 | 3/1980 | Weber . |
| 4,266,098 | 5/1981 | Novak ..................................... 379/142 |
| 4,348,554 | 9/1982 | Asmuth ................................... 379/221 |
| 4,611,094 | 9/1986 | Asmuth et al. . |
| 4,611,096 | 9/1986 | Asmuth et al. . |
| 5,029,196 | 7/1991 | Morganstein ........................... 379/142 |
| 5,247,571 | 9/1993 | Kay et al. ............................... 379/207 |
| 5,388,150 | 2/1995 | Schneyer et al. ....................... 379/142 |
| 5,436,957 | 7/1995 | McConnell ............................. 379/196 |
| 5,539,817 | 7/1996 | Wilkes . |
| 5,574,780 | 11/1996 | Andruska et al. ...................... 379/220 |
| 5,574,781 | 11/1996 | Blaze . |
| 5,592,541 | 1/1997 | Fleischer, III et al. ................. 379/220 |
| 5,680,446 | 10/1997 | Fleischer, III et al. ................. 379/196 |

OTHER PUBLICATIONS

Berman, Roger K., and Brewster, John H., Perspectives on the AIN Architecture, "IEEE Communications Magazine", Feb. 1992, pp. 27–32.

"Advanced Intelligent Network Release 0.1 Switching System Generic Requirements", Bell Communications Research, Technical Reference TR–NWT–001284, Issue 1 (Aug. 1993).

"Advanced Intelligent Network Release 0.1 Switch–Service Control Point Application Protocol Interface Generic Requirements", Bell Communications Research, Technical Reference TR–NWT–001285, Issue 1 (Aug. 1992).

*Primary Examiner*—Ahmad F. Matar
*Attorney, Agent, or Firm*—Greenblum & Bernstein, P.L.C.

[57] ABSTRACT

An advanced intelligent communication system is provided as an overlay application to, for example, one or more private networks. The system adds increased flexibility to an existing private network by facilitating remote access to the private network from non-network locations or stations. The system authorizes the remote access to the private network based on a calling party number of the non-network station and/or an authorization code entered by the remote calling party. Once authorized, the remote calling party is then enabled to terminate a call to a private network station identified by a private network telephone number.

71 Claims, 19 Drawing Sheets

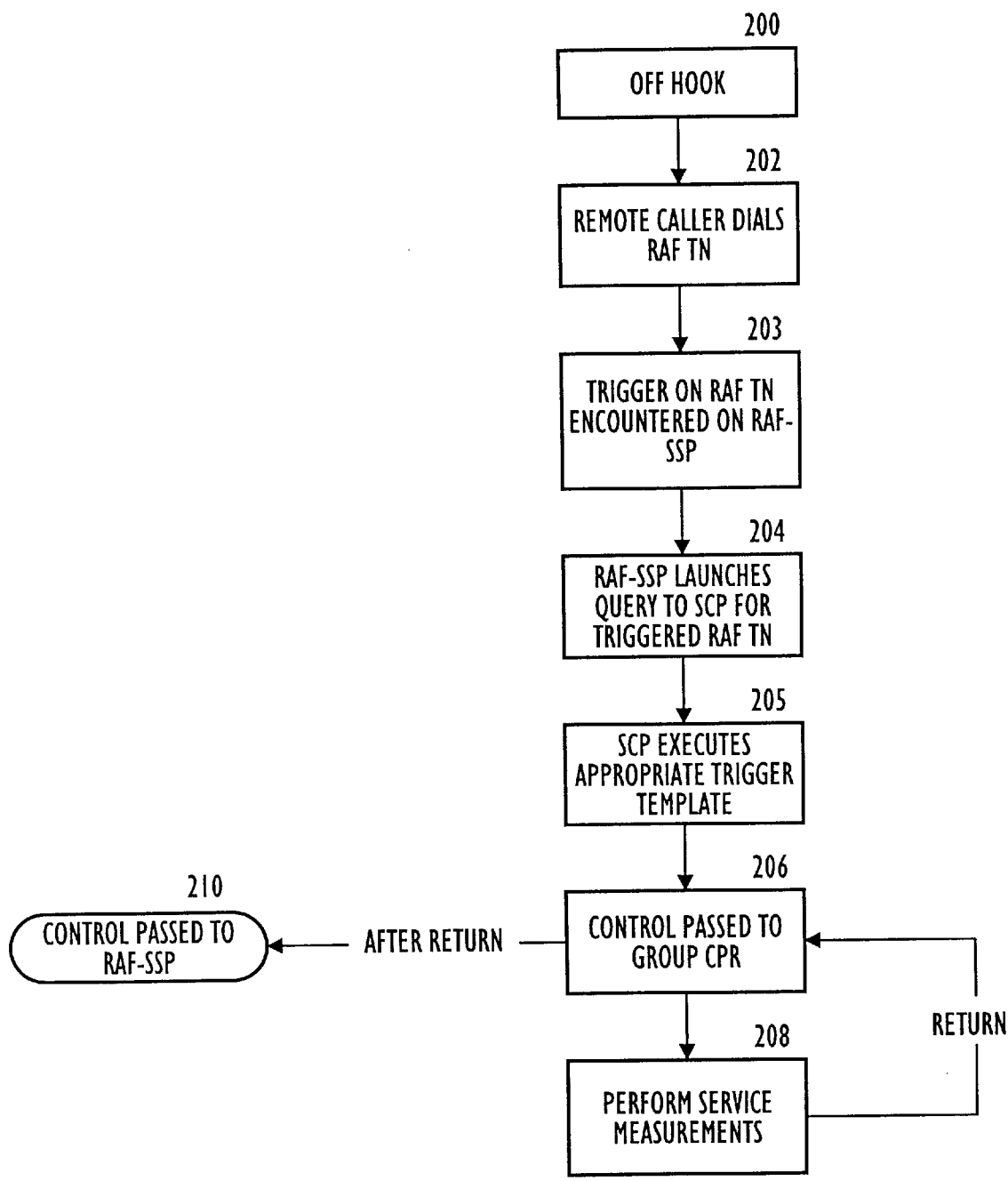

FIG. 3

| ROW ON TEMPLATE | NAME | DEFAULT | REMARKS |
|---|---|---|---|
| 1 | SCREENING OPTION | CPN ONLY | 4 OTHER VALUES CAN BE SELECTED. |
| 2 | AUTHORIZATION CODE LENGTH | 6 | RANGE IS FROM 6 TO 9. |
| 3 | CPN OPTION | CPN REQUIRED | 2 OTHER VALUES CAN BE SELECTED. |
| 4 | TRIGGERING SWITCH TYPE | 5ESS | POSSIBLE VALUES DMS-100, 5ESS AND 1AESS (DMS-100 AMD 5ESS THE SAME). |
| 5 | PRIMARY TO CONFIGURATION | 2 | POSSIBLE VALUES ARE 1 OR 2. |
| 6 | PRIMARY TG NUMBER | 00000000 | DEFAULT MUST NOT BE USED. MUST BE REPLACED WITH ORN/RI. |
| 7 | ALT. TG CONFIGURATION | 2 | POSSIBLE VALUES ARE 1 OR 2. |
| 8 | ALTERNATE TG NUMBER | 00000000 | DEFAULT MUST NOT BE USED. MUST BE REPLACED WITH ORN/RI IF ACTIVE. |
| 9 | SECOND ALT. TG CONFIG. | 2 | POSSIBLE VALUES ARE 1 OR 2. |
| 10 | SECOND ALT. TG NUMBER | 00000000 | DEFAULT MUST NOT BE USED. MUST BE REPLACED WITH ORN/RI IF ACTIVE. |

| CONFIGURATION | | | | | | | | | | | | | | | |
|---|---|---|---|---|---|---|---|---|---|---|---|---|---|---|---|
| TRUNK GROUP 1 | 2 | 2 | 2 | 2 | 2 | 2 | 2 | 2 | 2 | 2 | 2 | 2 | 2 | 2 | 2 |
| TRUNK GROUP 2 | | | | | | 2 | 2 | 2 | 2 | 2 | 2 | 2 | 2 | 2 | 2 |
| TRUNK GROUP 3 | | | | | | | | | | | 2 | 2 | 2 | 2 | 2 |
| SCREENING | | | | | | | | | | | | | | | |
| 1-CPN ONLY | √ | | | | | √ | | | | | √ | | | | |
| 2-AUTHORIZATION CODE ONLY | | √ | | | | | √ | | | | | √ | | | |
| 3-AC IF NO CPN | | | √ | | | | | √ | | | | | √ | | |
| 4-AC IF CPN NOT AUTH | | | | √ | | | | | √ | | | | | √ | |
| 5-CPN & AC | | | | | √ | | | | | √ | | | | | √ |
| CPN REQUIREMENT | | | | | | | | | | | | | | | |
| REQUIRED | √ | | | √ | √ | | | | √ | √ | | | | | √ |
| NOT REQUIRED | | √ | √ | √ | | √ | √ | √ | | | √ | √ | √ | | |

FIG. 7

| | AUTHORIZED CPN |
|---|---|
| 1 | 3145552584 |
| 2 | 3145552585 |
| 3 | 3145555609 |
| 4 | 3145554610 |

FIG. 8B

| | AUTHORIZATION CODE |
|---|---|
| 1 | 789123 |
| 2 | 791234 |
| 3 | 797345 |
| 4 | 799567 |

FIG. 8A

| | AUTHORIZATION CODE | PROVIDED CPN |
|---|---|---|
| 1 | 789123 | 3145558102 |
| 2 | 791234 | 3145556194 |
| 3 | 797345 | 3145552122 |
| 4 | 799567 | 3145550687 |

METHOD AND APPARATUS FOR FACILITATING REMOTE COMMUNICATIONS ACCESS TO MULTIPLE LOCATIONS WITHIN A TELECOMMUNICATIONS NETWORK

BACKGROUND OF THE INVENTION

1. Field of the Invention

The present invention generally relates to an apparatus and method for facilitating remote communications access to a multiple location private network within a telecommunications network. More particularly, the present invention relates to an Advanced Intelligent Network (AIN) application for providing multiple location networking capabilities to remote callers accessing a private network from an off-network location.

2. Acronyms

The written description provided herein contains acronyms which refer to various communication services and system components. Although known, use of several of these acronyms is not strictly standardized in the art. For purposes of the written description herein, acronyms will be defined as follows:

10D—10 Digit Trigger
AC—Authorization Code
ATG—Alternate Trunk Group
AIN—Advanced Intelligent Network
CCIS—Common Channel Interoffice Signaling
CCS—Common Channel Signaling
CDN—Called Number
CGN—Calling Number
CENTREX—Central Exchange Service
CO—Central Office
CPN—Calling Party Number
CPR—Call Processing Record
DID—Direct Inward Dialing
DLN—Dialed Line Number
DRS—Data and Reports System
EO—End Office
ISCP—Integrated Service Control Point
IXC—Interexchange Carrier
LATA—Local Access and Transport Area
LCS—Local Calling Scope
MF—Multi-Frequency
NANP—North American Numbering Plan
NPA—Number Plan Area
NXX—Central Office Code
ORN—Office Route Number
PBX—Private Branch Exchange
PIC—Primary Interexchange Carrier
POP—Point of Presence
PRI—Primary Rate Interface
PTG—Primary Trunk Group
PSTN—Public Switched Telephone Network
RAF—Remote Access to Facilities
RI—Route Index
SATG—Second Alternate Trunk Group
SCE—Service Creation Environment
SCP—Service Control Point
SMDR—Station Message Detail Recording
SMS—Service Management System
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number

3. Background and Material Information

In recent years, a number of new telephone service features have been provided by an Advanced Intelligent Network (AIN). The AIN evolved out of a need to increase the capabilities of the telephone network architecture to meet the growing needs of telephone customers. The AIN architecture generally comprises two networks, a data messaging network and a trunked communications network. The trunked communications network handles voice and data communications between dispersed network locations, whereas the data messaging network is provided for controlling operations of the trunked communications network.

An illustration of the basic components of an AIN architecture is shown in FIG. 11. As shown in FIG. 11, Service Switching Points (SSPs) 64–70 are provided for sending and receiving data messages from a Service Control Point (SCP) 56 via Signaling Transfer Points (STPs) 58–62. The data messages are communicated to and from the SSPs 64–70 and the SCP 56 along a Common Channel Signaling (CCS) network 88. Each SSP 64–70 routes telephone calls between a plurality of dispersed network stations 172–186. For example, SSPs 64–70 may rout a telephone call between a calling station (e.g., station 172) and a called station (e.g., station 184) through trunks 90 and lines 92 (e.g., telephone lines). Stations 172–186 may comprise various customer or terminal equipment, such as a telephone unit (wired, cellular or mobile), a facsimile machine, and/or a modem attached to a personal computer. For more information regarding AIN, see Berman, Roger K., and Brewster, John H., "Perspectives on the AIN Architecture," IEEE Communications Magazine, February 1992, pp. 27–32, the disclosure of which is expressly incorporated herein by reference in its entirety.

A number of features provided by the prior AIN or AIN-type intelligent networks relate to specialized call processing of incoming calls and call traffic.

For example, U.S. Pat. No. 4,191,860, to WEBER, provides for special processing of calls, such as INward WATS (Wide Area Telephone Service) calls, via a number of local switching offices based on information stored in a central database. The central database is located at a remote Service Control Point (SCP). The local and toll offices of the telephone network compile a call data message via a common channel interoffice signaling (CCIS) link to the central database. The database at the SCP translates the dialed INWATS number into an unlisted destination telephone number based on an originating area code. The unlisted destination number is then returned to the central offices via the CCIS link, and the call is completed. When the number of telephone calls to the unlisted number per unit time exceeds a threshold, the database instructs the telephone system to inhibit such calls from being connected for a predetermined period of time.

U.S. Pat. Nos. 4,611,094 and 4,611,096, both to ASMUTH et al., disclose a system for providing custom incoming telephone call processing services to a subscriber operating at geographically diverse locations. A subscriber program stored in a central database is accessed to provide instructions to the SSPs to complete incoming calls to one of the subscriber locations in accordance with special services defined by the subscriber. The subscriber program controls the Action Control Points (ACPs) to string together the desired call processing capabilities to process each call. Specified parameters stored in the program, such as time of day, caller location and data inputted by the caller, determine the final destination to which each call should be completed.

U.S. Pat. No. 5,247,571, to KAY et al., discloses an Area Wide Centrex system to provide specialized calling features to stations connected to a plurality of central offices. Each of the central office switching points connects to a number of local telephone lines. The features are extended to the local telephone lines by taking the programming intelligence out of the central offices and moving it to a database located in a central location, such as an SCP. Service features are controlled by the central database and are changed by reprogramming the service logic located at the central database. A variety of service features are provided including extension number dialing and call transfer across groups of lines connected to different exchanges. In addition, a work-at-home feature is provided such that when a user from a predetermined home telephone number dials a desired number, access may be granted to certain features of the Area Wide Centrex system.

While prior AIN or AIN-type intelligent network applications have provided various call screening and processing features to subscribers and users, such past attempts have not extended the advantages of AIN functionality to private networks. In particular, prior attempts have not provided a remote access capability to supplement and enhance services to subscribers or users of an existing private network (e.g., networks comprising one or more PBX and/or Centrex systems, networks comprising one or more types of switch types, and networks comprising one or types of trunk configurations) to facilitate multiple location communication and provide increased flexibility to private network users. For example, in private networks having geographically dispersed locations and served by different switches, past attempts have not permitted remote callers to access the private network from any non-network location. This type of capability could enable subscribers to place local area and long distance calls to other locations on the private network at substantially reduced cost. Past attempts have also failed to provide adequate security screening features to control access to private networks from off-network locations through various screening or authorization features, including providing authorization through the use of different types of identifiers.

Such features would be desirable and provide advantages to subscribers and users of private communication networks, such as large multi-location/multi-switch corporate subscribers and government agencies, that desire ease of inter- and intra-location calling, especially from, for example, existing CENTREX and Private Branch Exchange (PBX) sites.

OBJECTS OF THE PRESENT INVENTION

In view of the above, the present invention, through one or more of its various aspects and/or embodiments is thus presented to accomplish one or more objects and advantages, such as those noted below.

A general object of the present invention is to provide a flexible, multiple location private telecommunications network. Another object of the invention is to provide a flexible private network for use in an Advanced Intelligent Network (AIN) which facilitates remote access from off-network locations.

Yet another object of the present invention is to provide AIN or AIN-type functionality to a multiple location private network that includes authorization codes to be entered by remote callers to access optional features of the private network.

A further object of the present invention is to provide AIN or AIN-type functionality to a multiple location private network that includes screening based on a calling party number to control access to features of the private network.

Another object of the present invention is to provide AIN or AIN-type functionality to a multiple location private network that includes an optional feature for automatically selecting a predefined routing scheme for on-network terminating calls.

Still another object of the present invention is to provide AIN or AIN-type functionality to a multiple location private network that includes an optional feature for screening calls according to the originating location and authorization code.

A further object of the present invention is to provide AIN or AIN-type functionality to a multiple location private network that includes an optional feature to provide a calling party number based on an authorization code entered by the remote caller.

Yet another object of the present invention is to provide an AIN protocol independent service logic to implement the above-noted features of the present invention.

Another object of the present invention is to provide AIN or AIN-type functionality to a multiple location private network that includes a combination of the above options.

SUMMARY OF THE PRESENT INVENTION

Accordingly, one aspect of the present invention is to provide a system for facilitating remote access to a private network within an advanced intelligent communications system. The advanced intelligent communications system may include a service control point, a two-way communications network interconnecting a plurality of private network service switching points and a plurality of non-private network service switching points. The two-way communications network selectively establishes communication between at least two of a plurality of geographically dispersed locations coupled to the private network and non-private network service switching points, where the at least two locations may include a remote non-network originating station and a network terminating station. The remote access system includes a device for receiving, at one of the plurality of network service switching points, a remote access request from the remote non-network originating station to establish a communication connection with the private network, where the one network service switching point may also include a device for identifying a service control point request based upon the remote access request. The remote access system may also include a device for accessing the service control point in response to the service control point request identified by the identifying device, and a device for authorizing, at the service control point, the call request in accordance with one of a plurality of predefined screening criteria. The remote access system may also include a device for collecting, in response to the remote non-network originating station being authorized by the authorizing device, a network telephone number identifying the network terminating station. The remote access system may further include a device for defining at least one routing path from the one network switching control point to the network terminating station, and a device for establishing the communication connection between the non-network originating station and the network terminating station in accordance with the at least one routing path.

According to another feature of the invention, the screening criteria may include a calling party number of the non-network originating station, and the authorizing device may include a calling party number access look-up table including valid calling party numbers.

According to another feature of the invention, the authorizing device may authorize the remote access call request based on a correlation of the remote non-network station calling party number and one of the valid calling party numbers.

According to another feature of the invention, the screening criteria may include an authorization code entered by a caller at the non-network origination station, where the authorizing device may include an authorization code access look-up table including valid authorization codes.

According to another feature of the invention, the authorizing device may authorize the remote access call request based on a correlation of the authorization code entered by the caller and one of the valid authorization codes.

According to another feature of the invention, the one screening criteria may include a calling party number of the non-network originating station or an authorization code entered by a caller at the non-network origination station, and the authorizing device may include at least one of a calling party number access look-up table including valid calling party numbers, and an authorization code access look-up table including valid authorization codes.

According to another feature of the invention, the authorizing device may authorize the remote access call request based on a correlation of the calling party number of the non-network originating station and one of the valid calling party numbers and a correlation of the authorization code entered by the caller and one of the valid authorization codes.

According to another feature of the invention, the authorizing device may authorize the remote access call request based on a correlation of the authorization code entered by the caller and one of the valid authorization codes if the calling party number of the non-network originating station is not received by the authorizing device.

According to another feature of the invention, if the authorizing device authorizes the remote access call request, the authorizing device provides an associated calling party number.

According to another feature of the invention, the authorizing device may authorize the remote access call request based on a correlation of the authorization code entered by the caller and one of the valid authorization codes if the calling party number of the non-network originating station is not correlated to one of the valid calling party numbers.

According to another feature of the invention, the service control point may include routing information which includes at least one of a primary trunk group, an alternate trunk group, and a second alternate trunk group, the primary trunk group, the alternate trunk group and the second alternate trunk group being routing paths within the private network.

According to another feature of the invention, the routing path defining device may determine the routing path based on the routing information and the availability of the primary trunk group, the alternate trunk group and the second alternate trunk group.

According to another aspect of the present invention, the routing information may include a trunk signaling type, which is determined in accordance with at least one of the network service switching points connected to at least one of the primary trunk group, the alternate trunk group and the second alternate trunk group.

According to another feature of the invention, the service control point may comprise a device for identifying a protocol of the remote access request, and the authorizing device and the routing path defining device may be adapted to authorize and route the remote access request in accordance with the protocol identified by the identifying device so that a plurality of protocols are compatible with the remote access system.

According to another feature of the invention, the remote access system may further include a device for terminating the connection with the private network if the authorizing device fails to authorize the remote access request.

According to another feature of the invention, authorizing device may include a device for evaluating the predefined screening criteria in accordance with combinations of more than one of the predefined screening criteria.

According to another feature of the present invention, the screening criteria may include at least one of a calling party number required, a calling party number not required, or calling party number provided.

Accordingly, another aspect of the present invention is to provide a system for facilitating remote access to a private network comprising at least one network service switching point, where the system selectively establishes communication between a non-network originating station and a network terminating station of the private network. The system may include a device for receiving, at the at least one network service switching point, a remote access request from the non-network originating station to establish a communication connection with the private network, and a device for authorizing the remote access call request in accordance with one of a plurality of predefined screening criteria. The system may also include a device for collecting, in response to the remote access call request being authorized by the authorizing device, a network telephone number identifying the network terminating station, a device for defining a routing path from the at least one network service switching point to the network terminating station through the private network, and a device for establishing the communication connection between the non-network originating station and the network terminating station based on the routing path defined by the routing path defining device.

According to another feature of the invention, the system may include routing information which includes at least one of a primary trunk group, an alternate trunk group, and a second alternate trunk group, the primary trunk group, the alternate trunk group and the second alternate trunk group being routing paths within the private network.

Accordingly, yet another aspect of the present invention is to provide a system for facilitating remote access to a private network within an advanced intelligent communications system. The advanced intelligent communications system may include a service control point, a two-way communications network interconnecting a plurality of network service switching points and a plurality of non-network service switching points, where the two-way communications network selectively establishes a communication connection between at least two of a plurality of geographically dispersed locations coupled to the network and non-network service switching points. The at least two locations include a remote non-network originating station and a network terminating station. The system may include a call request receiving device, the call request receiving device receiving by one of the plurality of network service switching points a remote access request from the remote non-network originating station to establish a communication connection with the private network, the one network service switching point identifying a service control point request based upon the remote access request. The system may also include an authorization database, where the authorization database may be accessed at the service control point in response to the service control point request to authorize the call request in accordance with one of a plurality of screening criteria. The system may include a digit collection device for collecting, in response to the authorization of the call request, at the network service switching point a network telephone number identifying the network terminating station, and a routing database, where the routing database may be accessed by the service control point to determine at least one routing path from the one network service switching point to the network terminating station, the communication connection being established in accordance with the at least one routing path.

According to another feature of the invention, the screening criteria may include a calling party number of the non-network originating station, where the authorizing database may include a calling party number access look-up table including valid calling party numbers.

According to another feature of the invention, the authorization database may authorize the remote access call request based on a correlation of the calling party number of the non-network originating station and one of the valid calling party numbers.

According to another feature of the invention, the screening criteria may include an authorization code entered by a caller at the non-network origination station, where the authorizing database may include an authorization code access look-up table including valid authorization codes.

According to another feature of the invention, the authorization database may authorize the remote access call request based on a correlation of the authorization code entered by the caller and one of the valid authorization codes.

According to another feature of the invention, the one screening criteria may include a calling party number of the non-network originating station or an authorization code entered by a caller at the non-network origination station, and the authorizing database may include at least one of a calling party number access look-up table including valid calling party numbers, and an authorization code access look-up table including valid authorization codes.

According to another feature of the invention, the authorization database may authorize the remote access call request based on a correlation of the calling party number of the non-network originating station and one of the valid calling party numbers and a correlation of the authorization code entered by the caller and one of the valid authorization codes.

According to another feature of the invention, the authorization database may authorize the remote access call request based on a correlation of the authorization code entered by the caller and one of the valid authorization codes if the calling party number of the non-network originating station is not received by the authorization database.

According to another feature of the invention, if the authorization database authorizes the remote access call request, the authorization database may provide an associated calling party number.

According to another feature of the invention, the authorization database may authorize the remote access call request based on a correlation of the authorization code entered by the caller and one of the valid authorization codes if the calling party number of the non-network originating station is not correlated to one of the valid calling party numbers.

According to another feature of the invention, the service control point may include routing information which may include at least one of a primary trunk group, an alternate trunk group, and a second alternate trunk group, the primary trunk group, the alternate trunk group and the second alternate trunk group which may comprise routing paths within the private network.

According to another feature of the invention, the routing database may define the routing path based on the routing information and the availability of the primary trunk group, the alternate trunk group and the second alternate trunk group.

According to another feature of the invention, the service control point may include a protocol identifying device to identify a protocol of the remote access request, the authorizing database and the routing path defining database may be adapted to authorize and route the remote access request in accordance with the identified protocol so that a plurality of protocols are compatible with the remote access system.

According to another feature of the invention, the remote access system may further include a call termination device, where the call termination device terminating the connection with the private network if the service control point fails to authorize the remote access request.

Accordingly, still another aspect of the present invention is to provide a method of providing remote access in a system for facilitating remote access to a private network within an advanced intelligent communications system. The advanced intelligent communications system may include a service control point, a two-way communications network interconnecting a plurality of network service switching points and a plurality of non-network service switching points, and where the two-way communications system selectively establishes communication between at least two of a plurality of geographically dispersed locations coupled to the network and non-network service switching points. The at least two locations may include a remote non-network originating station and a network terminating station. The method of providing remote access may include the steps of receiving, at one of the plurality of network service switching points, a remote access request from the remote non-network originating station to establish a communication connection with the private network, the one network service switching point identifying a service control point request based upon the remote access request, and accessing the service control point in response to the service control point request identified by the service control point. The method may further include the steps of authorizing the call request at the service control point in accordance with one of a plurality of predefined screening criteria, and collecting, based on the authorization of the call request, a network telephone number identifying the network terminating station, and forwarding the network telephone number to the service control point. The method also may include determining at least one routing path through from the one network service switching point to the network terminating station, and establishing the communication connection between the non-network originating station and the network terminating station in accordance with the at least one routing path.

According to another feature of the invention, the screening criteria comprises a calling party number of the non-network originating station, and the step of authorizing may include the step of accessing a calling party number access look-up table including valid calling party numbers.

According to another feature of the invention, the step of authorizing may further include correlating the calling party number of the non-network originating station and one of the valid calling party numbers to authorize the remote access request.

According to another feature of the invention, the screening criteria may include an authorization code entered by a caller at the non-network origination station, and the step of authorizing may further include the step of accessing an authorization code access look-up table including valid authorization codes.

According to another feature of the invention, the step of authorizing may further include correlating the authorization code entered by the caller and one of the valid authorization codes to authorize the remote access request.

According to another feature of the invention, the one screening criteria may include a calling party number of the non-network originating station or an authorization code entered by a caller at the non-network origination station, and the step of authorizing may include accessing at least one of a calling party number access look-up table including valid calling party numbers, and an authorization code access look-up table including valid authorization codes.

According to another feature of the invention, the step of authorizing may include the step of correlating the calling party number of the non-network originating station and one of the valid calling party numbers and an authorization code entered by the caller and one of the valid authorization codes to authorize the remote access request.

According to another feature of the invention, the step of authorizing further may further include the step of correlating of the authorization code entered by the caller and one of the valid authorization codes if the calling party number of the non-network originating station is not received by the authorizing device to authorize the remote access request.

According to another feature of the invention, if the remote access call request is authorized, the step of authorizing may include providing an associated calling party number.

According to another feature of the invention, the step of authorizing may further include the step of correlating of the authorization code entered by the caller and one of the valid authorization codes if the calling party number of the non-network originating station is not correlated to one of the valid calling party numbers to authorize the remote access request.

According to another feature of the invention, the step of defining a routing path may include the step of determining the routing path based on the routing information and the availability of the primary trunk group, the alternate trunk group and the second alternate trunk group.

According to another feature of the invention, the step of defining a routing path may include a trunk signaling type which is determined in accordance with at least one of the network service switching points connected to at least one of the primary trunk group, the alternate trunk group and the second alternate trunk group.

According to another feature of the invention, the remote access method may further include the step of identifying a protocol of the remote access request so that a plurality of protocols are compatible with the remote access system.

According to another feature of the invention, the remote access method may further include the step of terminating the connection with the private network if the remote access request is not authorized.

According to another feature of the invention, the step of authorizing may further include the step of evaluating the predefined screening criteria in accordance with combinations of more than one of the predefined screening criteria.

According to another feature of the invention, screening criteria may include at least one of a calling party number required, a calling party number not required, or calling party number provided.

The above-listed and other objects, features and advantages of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like references numerals represent similar parts throughout the several views of the drawings, and wherein:

FIG. 2 illustrates an exemplary flow diagram of call processing according to the present invention;

FIG. 3 illustrates an exemplary trigger template containing service logic at a service control point to receive a query from a switch location;

FIG. 6A illustrates exemplary valid combinations of options for DMS-100 and 5ESS AIN equipped switches;

FIG. 6B illustrates exemplary valid combinations of options for 1AESS AIN equipped switches;

FIG. 7 illustrates an exemplary authorized CPN table;

FIG. 8A illustrates an exemplary authorization code and provided CPN table for authorizing callers based on an entered authorization code;

FIG. 8B illustrates an exemplary authorization code table for authorizing callers based on an entered authorization code;

DETAILED DESCRIPTION OF THE PREFERRED EMBODIMENTS

Many telephone services may be provided using an advanced intelligent communications system for centralized control of telephone services offered to subscribers, as opposed to localized control of services at the Central Office (CO) or End Office (EO). AIN or AIN-type networks are examples of advanced intelligent communications systems.

An AIN system may be provided through interaction between switching points and other systems supporting AIN logic.

According to an aspect of the present invention, an apparatus and method for remote communications access to multiple locations may be implemented using an AIN or AIN-type network with at least AIN Release 0.0 or AIN Release 0.1 protocols and advanced intelligent network capabilities which are provided by a telephone company.

A subscriber, such as corporation or small business with multiple locations connected to one or more switches within the public switch telephone network may convert their current private network system to the multiple location communication network for facilitating remote access, as described hereinbelow. The subscriber's current private network system may include a CENTREX system or similarly configured private network. That is, the multiple location communication network for facilitating remote access may be implemented as an overlay to an existing private network, and may permit subscribers to decide how remote callers may access the private network from off-network locations to terminate an on-network call.

The presently disclosed network may add increased flexibility to an existing private network system by allowing remote callers to access the private network and, through subscriber-predefined routes, place a call to one or more terminating locations connected to the private network. According to an aspect of the invention, this overlay application may be implemented so that it does not disturb the subscriber's current service or the existing private network.

Figure 1:
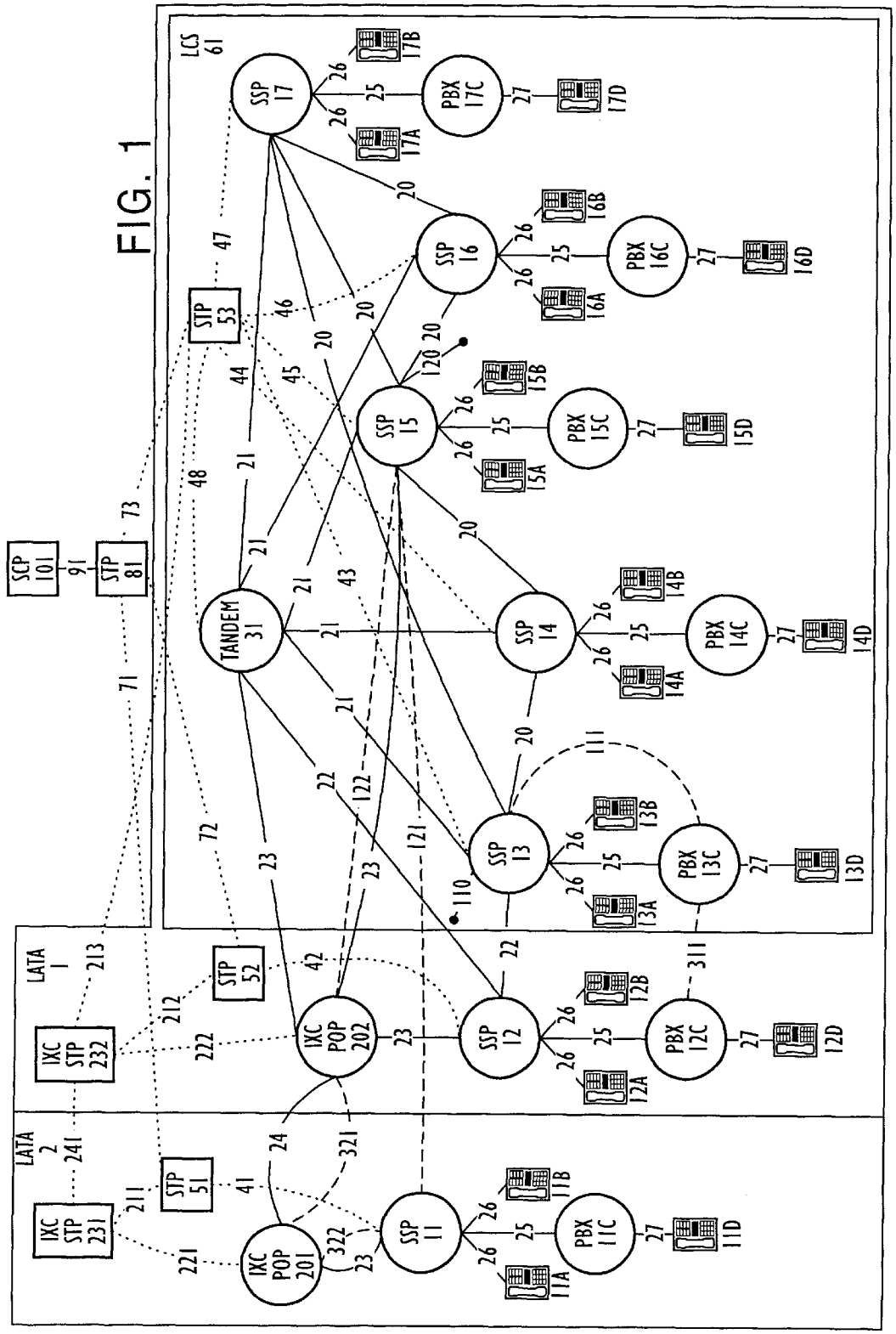
FIG. 1 illustrates, in a general block diagram form, an Advanced Intelligent Network (AIN) system for implementing the intelligent network remote access features, in accordance with an embodiment of the present invention.

Referring now to the accompanying drawings, the network arrangement of FIG. 1 is provided for purposes of illustration and not limitation, and other particular network arrangements may of course be used to implement the various features of the invention, as further described below. In the embodiment of FIG. 1, a network spanning two local access transport areas LATA 1 and LATA 2 is shown. Within LATA 1, a local calling scope (LCS) 61 is provided that defines or indicates the local toll-free calling service area. The LCS 61 includes stations, e.g., stations 13A, 13B, 13D, 14A, 14B, 14D, 15A, 15B, 15D, 16A, 16B, 16D, 17A, 17B, and 17D, and corresponding switches, e.g., service switching points (SSP) or end offices (EO) 13, 14, 15, 16 and 17 and PBX switches 13C, 14C, 15C, 16C and 17C interconnecting the individual stations. The EOs 13, 14, 15, 16 and 17 may comprise, for example, 1AESS, or 5ESS switches manufactured by AT&T having AIN Release 0.1 capabilities, or DMS-100 switches manufactured by Nortel having AIN Release 0.1 capabilities, or in the case of the 1AESS, additionally having AIN Release 0.0 capabilities. Additionally, it may be possible for the DMS-100 and 5ESS switches to have AIN Release 0.0 capabilities.

Also located within LATA 1, but outside of LCS 61, are stations 12A, 12B, and 12D, SSP (or EO) 12, and PBX 12C. Within LATA 2 are stations 11A, 11B, and 11D, SSP 11, and PBX 11C.

In the embodiment of FIG. 1, the exemplary multiple location private network comprises stations 11A, 12A, 13A, and 15A, and PBXs 11C (with station 11D connected), 12C (with station 12D connected), 13C (with station 13D connected), and 15C (with station 15D connected), each station including a specific on-network telephone number. Stations 11B, 12B, 13B, 14A, 14B, 15B, 16A, 16B, 17A and 17B are not locations on the private network, rather they represent other locations within the public switched telephone network (PSTN). Similarly, PBXs 14C (with station 14D connected), 16C (with station 16D connected), and 17C (with station 17D connected) are not part of the multiple location private network, but are merely representative of the possibility that other private branch exchanges may be connected to the public switched telephone network, from which, the multiple location private network of the present invention may be accessed. Each of the stations 11B, 12B, 13B, 14A, 14B, 15B, 16A, 16B, 17A and 17B include a specific off-network telephone number.

In the example shown in FIG. 1, each switch may include different types of facilities and/or triggers, and all SSPs are essentially equal (i.e., there is no switch hierarchy among the end offices). However, it should be noted that one or more of the SSPs may be equipped with an entry point to the private network. The entry point may be a specifically designated remote access to facilities telephone number (RAF TN), which is dialed by a remote caller to connect to the private network from an off-network location. As shown in the example of FIG. 1, SSPs 13 and 15 may be each equipped with a remote access TN, as indicated by reference numerals 110 and 120, respectively. In addition, other switches within the subscriber's multiple location communication network may be provided with a remote access TN.

According to the present invention, all switches that provide an entry point to the private network should be interconnected. As shown in FIG. 1, either a direct route or a tandem/IXC public route exists between all network switches. Network switches have an entry point to the private network. Non-network switches do not have an entry point to the private network. In LCS 61, direct toll-free trunks 20 exist between SSP 13, SSP 14, SSP 15, SSP 16 and SSP 17. Assuming LCS 61 to be a large service area, direct trunks may not be available between each switch, either actually or due to excessive traffic. For example, SSP 13 may alternatively use tandem trunk 21 to a tandem switch 31 and may use trunk 21 to SSP 17 to terminate an offered call. This alternative path is an overflow route for traffic that cannot find room on trunk 20 between SSP 13 and SSP 17. As can be seen in FIG. 1, a route should always exist between the switches that have an entry point to the private network, whether that route is direct or via over flow path.

FIG. 1 also includes private trunks 111, 121, 122, 311, 321 and 322 for interconnecting locations. The private trunks 111, 121, 122, 311, 321 and 322 may be accessible to subscribers of certain services. Further, the private trunks 111, 121, 122, 311, 321 and 322 may enable subscribers to reduce calling costs normally associated with public toll routes.

Each office equipped as an AIN SSP may allow normal switch processing to be suspended at specific points in a call so that the switch may send an AIN message query to SCP 101. Alternatively, SCP 101 may comprise an integrated service control point. Service control point 101 may execute software based service logic and return call processing instructions to the triggering AIN SSP. New services may be provisioned by assigning AIN SSP triggers to customer lines, trunks, and/or NANP telephone numbers. As noted above, the SSPs may include, but are not limited to, 5ESS, 1AESS, and DMS-100 switches. The 5ESS switches may utilize an AIN Release 0.1 protocol and should be equipped with Generic 5E9.1 (or higher) software and associated AIN SSP features in order to serve subscribers. The 1AESS switches may use an AIN Release 0.0 protocol or an AIN Release 0.1 protocol, and should be equipped with Generic 1AE12.03 (or higher) software and associated AIN SSP features in order to serve subscribers. The DMS switches may utilize an AIN Release 0.1 protocol and should be equipped with Generic BCS-36 (or higher) software and associated AIN SSP features. Specifications of AIN Release 0.1 SSPs may be found in Bellcore documents *TR-NWT*-001284, "Advanced Intelligent Network Release 0.1 Switching System Generic Requirements", Issue 1 (August 1993) and *TR-NWT*-001285, "Advanced Intelligent Network 0.1 Switch-Service Control Point Application Protocol Interface Generic Requirements", Issue 1 (August 1992) from Bell Communications Research, Inc., of Livingston, N.J., the disclosures of each document is incorporated by reference herein in its entirety.

FIG. 1 shows an example of a portion of a PSTN that includes the subscriber's private telephone network configured as a multiple location communications network for facilitating remote access. Each of the individual private network stations, i.e., 11A, 11D, 12A, 12D, 13A, 13D, 15A, and 15D, include an associated on-network TN and each is shown connected to respective SSPs or PBXs (e.g., SSPs 11, 12, 13 and 15, and PBXs 11C, 12C, 13C and 15C). Each of the individual off-network stations, i.e., 11B, 12B, 13B, 14A, 14B, 14D, 15B, 16A, 16B, 16D, 17A, 17B and 17D, include an associated off-network TN and is shown connected to respective SSPs and PBXs (e.g., SSPs 11–17, and PBXs 14C, 16C and 17C). Each individual station 11A–17D may include terminal equipment, such as a telephone, and may be either directly connected to its respective switch by a local telephone line 26 or connected via a private branch exchange (PBX) (e.g., 11C–17C). As shown in FIG. 1, each PBX has normal, public connection to its associated SSP through trunks 25. FIG. 1 also shows PBX 12C and PBX 13C coupled by a private trunk (e.g., a private tie line trunk 311). This permits LCS 61 traffic from PBX 13C to be connected to PBX 12C without the need for traffic to be routed over toll trunks 22 or 23. For example, PBX 12C may use trunk 311 to enter LCS 61 and PBX 13C may route traffic to other locations on the private network in LCS 61 via trunk 25 and SSP 13. SSP 13 may then tandem traffic to any multiple location switch within LCS 61. Conversely, any traffic from within LCS 61 may be directed to SSP 13 and terminated to one of SSP 11 or SSP 12 over trunk 311 through PBX 12C and trunk 25.

The SSPs 11–17 may be interconnected by various trunking options. For example, because SSPs 13–17 are within the LCS 61, SSPs 13–17 may be coupled to one another via trunks 20, or through the tandem switch 31 by trunks 21. In this type of connection, trunks 20 and trunks 21 may be treated as non-toll trunks, as SSPs 13–17 are within LCS 61. SSPs 13–17 may be connected to SSP 12 by the tandem switch 31 through trunks 21 and trunk 22, as SSP 12 is outside the LCS 61. Because SSP 12 is within LATA 1, but outside LCS 61, trunks 21 may be treated as a toll trunk, and trunk 22 may be a toll trunk.

The private trunks 121, 122, and 311 are not provided for terminating local traffic. Instead, local traffic is terminated via the local trunks 20. The private trunks 121, 122 and 311 may be utilized for toll calls, e.g., from within LCS 61 to other normally toll call locations within LATA 1, or from LCS 61 to LATA 2. If a caller at station 15A is calling station 11A, the offered call would be directed from SSP 15 to SSP 11 over private trunk 121. Thus, utilizing private trunks 121, 122 and 311 minimizes toll charges while also minimizing private trunk costs. The private trunks may be either multifrequency trunks (MF), or primary rate interface (PRI) trunks, and the type of trunk will be in accordance with both the sending and receiving SSP to which it is connected. If either of the SSPs is a 1AESS type switch, the trunk will be a MF type trunk as the 1AESS is not capable of supporting PRI trunks. However, if both the sending and receiving switches are either a DMS-100 switch or a 5ESS switch, the private trunk may be either a MF or PRI type trunk.

As described above, within LATA 1 is a tandem switch 31 that is connected to each of the SSPs 12–17. The tandem switch 31 is coupled to each of the SSPs 13–16 of LCS 61 by trunks 21. Trunks 21 may interconnect tandem switch 31 with each SSP within LCS 61 for toll-free telephone calls. However, trunks 21 may also be used to connect tandem switch 31 to, e.g., toll calls that terminate on SSPs outside LCS 61, but within LATA 1; calls terminating on SSPs outside LATA 1; and, calls originating outside of LCS 61 but terminating on an SSP within LCS 61. The tandem switch 31 is also coupled to SSP 12 by trunk 22, which may be a trunk connecting SSPs (or tandem switches) to other SSPs within the same LATA but not within the same LCS.

Trunk 22 may be used to carry intra-LATA toll calls. Because SSP 12 and SSP 13 are close to each other and have a high community of interest, direct intra-LATA toll trunk 22 may be provided for connecting SSP 12 and SSP 13. Trunk 22 may overflow at SSP 13 to trunk 21 then tandem 31, which will then use its intra-LATA toll trunk 22 to complete to SSP 12. Trunk 22 may overflow at SSP 12 to intra-LATA toll trunk 22 to the tandem switch 31, which uses trunk 21 to complete to SSP 13. Within the rest of the LATA, the community of interest does not permit economical direct trunking between points. Thus, all other intra-LATA toll traffic has been shown as a combination of trunks 21 and 22 through the tandem switch 31.

According to the exemplary embodiment of FIG. 1, the subscriber may designate, for example, an interexchange carrier (IXC) associated with an IXC point of presence (POP) switch 202 within LATA 1, and an IXC POP switch 201 within LATA 2. Because IXC POP 202 has been designated as the interexchange switching point, IXC POP 202 may be connected to switch 15 via a private trunk 122 to provide, for example, direct delivery of a high volume of intra-LATA traffic via private trunks, thus, avoiding access charges on PSTN intra-LATA toll traffic. Further, as shown in FIG. 1, IXC POP 202 may be connected to the other individual SSPs within the network either directly by a trunk 23 or indirectly via a trunk 23 to the tandem switch 31.

Trunk 23 may be used to connect SSPs (or tandem switches) to IXC POPs for calls to SSPs within other LATAs. For example, IXC POP 202 is connected to IXC POP 201, located within LATA 2, via trunk 24. IXC POP 201 is connected to SSP 11 by trunk 23. Trunk 24 is a dedicated trunk connecting the IXC POPs 201 and 202 across LATA boundaries. Alternatively, should the subscriber's volume of traffic between LATA 1 and LATA 2 be such that a dedicated private trunk is economical, a private trunk 321 may be provided to route traffic from LATA 1 to LATA 2. Also, if the subscriber's volume of traffic warrants, a private trunk 322 may be provided to connect SSP 11 to IXC POP 201. For example, under the circumstance that private trunk 121 is busy or otherwise unavailable, calls originating from any station within LATA 1 to station 11A may be routed from LCS 61 to LATA 2 by IXC POP 202 over private trunk 122 to IXC POP 202. From IXC POP 202, calls may be routed over private trunk 321 to IXC POP 201. From IXC POP 201, calls may be routed to SSP 11 over private trunk 322, and SSP 11 would then route the call to the telephone number of station 11A.

For the purposes of illustration, the multiple location communications network of FIG. 1 is shown as including only seven SSPs. However, more (or less) than seven SSPs may be utilized. The SSPs 11–17 are each programmable switches which: recognize AIN-type calls; launch queries to service control point (SCP) 101; and, receive commands and data from SCP 101 to further process and route AIN-type calls. When one of the SSPs is triggered by an AIN-type call, the triggered SSP formulates an AIN service request and responds to call processing instructions from the network element in which the AIN service logic resides. According to an aspect of the invention, the AIN service logic may reside in a database at SCP 101.

As noted above, the SCP 101 may comprise an integrated service control point (ISCP). The ISCP is an integrated system which may include a service management system (SMS), a data and reports system (DRS), a programmable service control point (SCP), and a service creation environment (SCE). The SCE may be provisioned as a terminal implemented to work with SMS to create, modify, and load services into the SCP database. The SCE may comprise, for example, a SPACE programming environment for creating and provisioning services. The SCP may execute software-based service logic and return call routing instructions to the triggering SSPs. The SMS may be provided for administrative purposes to synchronize customer CPR and data on the mated pair of ISCPs that SCP 101 represents. The DRS may be provided for compiling call information to be used for billing and administrative purposes. By way of example, the ISCP may be implemented with a Bellcore Integrated Service Control Point (ISCP), loaded with preferably at least ISCP software Version 4.0, available from Bell Communications Research, Inc., of Livingston, N.J.

In order to facilitate signaling and data messaging, each SSP and tandem switch within the multiple location communications network for facilitating remote access is equipped with Common Channel Signaling (CCS) capabilities, e.g., Signaling System 7 (SS7), which provides two-way communications of data messages over CCS links 41–48 between each SSP and tandem switch 31 and the SCP 101. The data messages may be formatted in accordance with the Transaction Capabilities Applications Part (TCAP). The telephone network essentially employs an upper-level software controlled network through the Signaling Transfer Points (STPs) and the SCP (and/or ISCP). The software presides over the hardware to check the call route and the availability of connection prior to hardware connection.

Accordingly, the connections by links 41–48, links 71–73, and link 91 through STPs 51–53 and 81 are for signaling purposes, and allow each of the SSPs 11–17 to send and receive messages to and from SCP 101 via the STPs. As shown in FIG. 1, a local STP 53 may act as the data messaging control point for LCS 61. That is, all data messages from SSPs within LCS 61 or directed to SSPs within LCS 61 may be transmitted through STP 53. Accordingly, CCS links 43–48 are shown establishing a data link between STP 53 and either the tandem switch 31, SSP 13, SSP 14, SSP 15, SSP 16 or STP 17. For data messages from or to SSP 12 and other SSPs not within LCS 61, a CCS link 42 and a local STP 52 may be provided. For data messages from or to SSP 11, a CCS link 41 may be provided to a local STP 51. The connections by links 41–48 from the SSPs or tandem switch to the STPs are for signaling purposes, and allow the SSPs to send and receive messages to and from SCP 101. Each of STPs 51, 52, and 53 may be connected to other STPs. For example, CCS links 71, 72, 73, and 91 may be provided to interconnect SCP 101 to local STPs 51, 52, and 53 through a regional STP 81. Further, CCS links 211, 221, 212, 222, and 213 may be provided to interconnect an IXC STP 231 and IXC STP 232 to local STP 51, IXC POP 201, STP 52, IXC POP 202 and STP 53, respectively. An additional CCS link 241 may be established to couple the IXC STPs 231 and 232 to each other.

MULTIPLE LOCATION COMMUNICATIONS NETWORK TRIGGERS AND HARDWARE

1. AIN Triggers

The present invention contemplates at least three AIN triggers that may be implemented on the above-described AIN SSPs to facilitate accessing the subscribed features of the multiple location communications network for facilitating remote access. The 5ESS and DMS-100 AIN SSPs may be provisioned with a termination attempt trigger (TAT), and a 10 digit trigger (10D). The 1AESS AIN SSP may be provisioned with a dialed line number trigger (DLN), which is equivalent to the TAT.

A. Terminating Attempt Trigger

The TAT is a subscribed trigger that may be assigned to a directory number/call type, and is associated with AIN Release 0.1. Thus, the TAT may be assigned to a directory number that may or may not have any physical facilities assigned to it, i.e., the switch need not be within a network SSP. Whether physical facilities are associated with the TAT trigger may depend on the switch type. For example, DMS-100 and 1AESS switches do not require physical facilities for a TAT, but a 5ESS switch does require physical facilities for a TAT. The TAT may be assigned a trigger that includes, e.g., a seven to ten digit number that is dedicated solely for the purpose of triggering AIN functionality. The TAT may be implemented with AIN Release 0.1. On the 5ESS, the TAT trigger is preferable if there are less than 100 simultaneous trigger events expected.

B. 10 Digit Trigger

The 10 digit trigger is an office based trigger that may be assigned to a dialed number, and is associated with AIN Release 0.1. Accordingly, the 10 digit trigger may be programmed to recognize a dedicated or designated telephone number and to trigger AIN functionality in response to recognizing the designated telephone number.

On the 5ESS switch, a 10D trigger is preferable if there are more than 99 simultaneous trigger events expected.

C. Dialed Line Number Trigger

The dialed line number trigger (DLN) is functionally the same as the TAT, except that the DLN is implemented with AIN Release 0.0. Accordingly, the DLN may be programmed to recognize a dedicated or designated telephone number and to trigger AIN functionality in response to recognizing the designated telephone number.

2. Service Control Point

The multiple location communications network of the present invention may require several service logic programs (or call processing records (CPR)) to fully implement the subscriber's desired features within a single network. For example, each subscriber may require a CPR for AIN Release 0.0 implementation of subscribed service and a CPR for AIN Release 0.1 implementation of the subscribed service. However, common service logic for both AIN releases may be in the same CPR with protocol particular logic. The CPR may have a number of associated tables to be accessed by the SCP in implementing the particular service logic. It is also noted that each originating station requires a trigger CPR. Generally, a trigger CPR may be small and may include one or more graphs. Each graph within a trigger CPR may include at least two nodes (i.e., branch points within the service creation logic). For example, the graph may contain interconnected nodes to provide the service creation logic. In addition, each trigger CPR may include at least one call variable used by each graph to create the appropriate service logic. A graph may also use constants and call variables in executing the service logic. In addition, the call variables may be exclusive to a graph, shared among all graphs of a CPR, or shared among multiple CPRs. Call variables may be predefined from SS7 queries or used in SS7 responses. A particular type of call variable may be an embedded Table. Additionally, call variables may be service creator defined and may include subscriber supplied data, or may be temporarily defined during the execution of the service logic. A stand alone Tables is a unique object at the same level as a CPR. Embedded Tables and stand alone Tables are not a subset of CPRs equivalent to graphs in the SCP.

The service provisioner needs to know the AIN release or version of each network station's serving SSP because the SCP may use the telephone number and the AIN trigger type to generate a unique key for access to AIN functionality. Because AIN Release 0.1 and AIN Release 0.0 are different, some aspects of a service may need to be separated according to the AIN Release. Further, to create a unique key for access to AIN functionality, the AIN release may be needed to ensure that the proper service creation features and the protocols are utilized for effective and accurate communication with the SSP. According to the present invention, the trigger CPR may include separate graphs for each trigger (e.g., TAT, 10D and DLN) so as to support all trigger types within one set of subscriber provided data for call variables. Separate CPRs may also be provided for each of AIN Release 0.0 and Release 0.1 in order to improve performance; however, it is possible to use a single CPR to support the service features of the invention across AIN releases, as the individual tables stored in the SCP may be designed to accommodate all AIN versions of the present service.

An originating trigger CPR may be dedicated to each of the RAF TNs within the subscriber's network and may be maintained in the SCP to monitor triggering of AIN functionality by any of the network stations. Accordingly, the CPR may need to know what type of SSP is providing the AIN trigger and query message. Accordingly, the originating trigger CPR may be designed to transfer control to an appropriate "transfer in" graph to translate the switch commands into common call variables usable by the CPR to continue the service logic. Use of the "transfer in" graph ensure maximum software reuse but may decrease SCP performance (capacity).

Each RAF TN located at the SSP may have an originating trigger on those lines comprising the private network. When the triggering event, i.e., origination of the offered call, occurs, the SSP may send a query for that calling party number (CPN) to the SCP. The SCP may use the CPN for screening and/or billing purposes as defined in the CPR.

As discussed above, if the triggering SSP is a 5ESS or DMS-100 type switch, AIN Release 0.1 functionality may be utilized. Preferably, the originating trigger CPR is small in size (i.e., a short program template) and transfers control to an appropriate "transfer in" graph in the common service logic CPR. A major function of the "transfer in" graph is to transform data in either AIN Release 0.0 or in AIN Release 0.1 protocol to generic, protocol insensitive values that the common service logic CPR can process. At the end of the common service logic CPR, control is transferred over to a "transfer out" graph to prepare an appropriate protocol response to send back to the SSP.

For purposes of illustration, various features of the present invention will now be described from the standpoint of a switch implementing either AIN Release 0.1 protocols or AIN Release 0.0 protocols and the CPR provisioned with TAT, 10D or DLN triggers. However, as will be apparent to those of ordinary skill in the art based on the disclosure provided herein, the present invention is not limited to implementation through AIN Release 0.1 or Release 0.0 and may be designed and provisioned with a network utilizing triggers associated with future AIN Releases.

MULTIPLE LOCATION COMMUNICATIONS NETWORK FOR FACILITATING REMOTE ACCESS SERVICE LOGIC

The remote access features of the present invention offer the private network subscriber the ability to allow off-network callers to remotely access the private network from an off-network location to terminate a call on the private network. The multiple location communications network of the present invention may provide a basic service from which subscribers may select and define a remote access telephone number, call screen option, authorization code option, calling party number option, trunk group configuration option, authorized telephone numbers, and authorization codes. While the available options will generally be described herein as if provisioned in the alternative, it is contemplated that these options may be combined in any of a wide variety of combinations to provide a single complex service, if desired.

Referring now to FIG. 2, there is illustrated an exemplary overview of the call flow logic according to an aspect of the present invention. FIG. 2 is provided as a brief or general summary of the numerous processes and operation of the call logic flow. Each of the illustrative steps in the call flow will be explained in greater detail herein during the description of each of the main steps of FIG. 2.

At step 200, the remote caller goes off-hook, and at step 202 the caller dials a remote access to facilities telephone number (RAF TN) to connect to a specific remote access SSP (RAF-SSP). As shown in FIG. 1, the remote access SSP may be for example, SSP 13 or SSP 15, and the remote caller connects by dialing a RAF TN, as indicated reference numeral 110 or 120, respectively. As noted above, the RAF TN is a telephone number which connects the remote caller to a particular SSP. Preferably, the RAF TN is within the remote caller's LCS 61, such that there is no toll cost associated with placing a call to the RAF-SSP. However, the RAF TN is not limited to telephone numbers within the LCS 61, and could be a telephone number outside the LCS 61 and within in either LATA 1 or LATA 2. Each RAF TN may have its own trigger template, and more than one RAF TN may be provided per RAF-SSP. Still optionally, the remote caller may call an "800" or "888" number which may be translated to the appropriate RAF TN to connect to the RAF-SSP. In the "800" or "888" scenario, the toll costs associated with the call are charged to the subscriber of the "800" or "888" service, not to the remote caller.

Although the present invention will be described with reference to a remote station connected to public switched telephone network, the remote caller may dial the RAF TN from a wireless station (e.g., cellular or mobile telephone), or may connect to the RAF TN through a paging service to transfer a message to the private network.

Once the remote caller is connected to the RAF-SSP, at step 203, the trigger on the RAF TN is encountered on the RAF-SSP. At step 204, the RAF-SSP launches a query to the SCP for the triggered RAF TN, and the SCP executes the appropriate trigger template at step 205 in accordance with the type of switch serving as the RAF-SSP. The SSPs which are served by DMS-100 and 5ESS switches may execute one type of trigger graph, and SSPs served by the 1AESS type switch may execute a slightly different type of trigger template, which will be explained in greater detail later.

FIG. 3 illustrates a exemplary trigger template defining the service logic necessary for the RAF-SSP to query the SCP which may be executed at step 205. The trigger template may be at the SCP, and may support both AIN Release 0.0 and Release 0.1. As noted above, the trigger template may be executed when the SCP receives the query from the RAF-SSP in step 204.

Row or location 1 of the trigger template defines the subscriber's screening option. As noted above, the trigger template essentially has little or no associated service logic, and passes control to common service logic CPRs (e.g., a CPR for AIN Release 0.0, and another CPR for AIN Release 0.1). According to the present invention, there may be five optionally selected screening options. The screening options may include calling party number (CPN) only; authorization code (AC) only; AC if the CPN is not present; AC if the CPN is invalid; and, CPN and AC. The details of the screening features of the present invention are described in greater detail with reference to FIGS. 4A–4E and 5A–5E.

One of the screening options is a Calling Party Number (CPN) Only screening option. According to the CPN Only option, a remote caller must call the RAF-SSP from a subscriber predefined CPN (e.g., 3145552584) in order to access the present invention. As shown in FIG. 7, authorized CPNs may be listed in a look-up table which is accessed as part of the subscriber's service logic. Although FIG. 7, illustrates four authorized CPNs, the present invention is not limited to having only four authorized CPNs, but may include more or less than four authorized CPNs which are authorized to access the present invention.

Another screening option that may be provided is an Authorization Code (AC) Only screening option. If the subscriber chooses AC only, the CPN may not be checked, but rather the remote caller enters a subscriber predefined authorization code (e.g., 789123) which is verified by the SCP. An example of an authorization code table is shown in FIGS. 8A and 8B. As shown in FIGS. 8A and 8B, the AC may be six digits in length; however, according to the present invention, the AC is preferable from 6–9 digits in length. Row 2 of the trigger template in FIG. 3 allows a subscriber to set the AC length. As shown in FIG. 8B, under AIN Release 0.1, the subscriber may provide a CPN using the authorization code table. According to the present invention, if no CPN, or an invalid CPN is received by the RAF-SSP, the subscriber may choose to provide a CPN which is correlated to the entered AC. The Provided CPN may be later used by the private network for billing purposes in configurations where a subscriber also specifies PRI trunks; and hence receives the CPN with the call. Under certain circumstances (e.g., SSPs served by 1AESS switches), the service features of the present invention may not be able to provide a CPN, thus the authorization table of FIG. 8B may be utilized. In addition, it is possible to use the authorization table of FIG. 8A for both AIN releases, as discussed below. Further, the AC length may be predefined by the subscriber, as shown in row 2 of the trigger template in FIG. 3. Similarly as in the case of the CPN only table of FIG. 7, the present invention is not limited to having only four authorized ACs, but may include more or less than four authorized ACs which are authorized to access the present invention.

According to another screening option called AC if no CPN, a remote caller may be prompted to enter an AC if no CPN is provided to the RAF-SSP. Under certain circumstances, for example, calls originating in switches which are not SS7 capable, the CPN is not forwarded to the RAF-SSP. Under this screening option, the remote caller will be prompted for an AC to access the present invention. The AC may be verified by the SCP using one of the exemplary AC tables shown in FIGS. 8A and 8B.

Another screening option called AC if Invalid CPN allows a remote caller accessing the private network from an unauthorized CPN to enter an AC to utilize the present invention. Thus, if a remote caller from "3145556870", which is not on the CPN table shown in, for example, FIG. 7, terminates at the RAF-SSP in order to access the present invention, the SCP may return to the RAF-SSP that the CPN is invalid, and instruct the RAF-SSP to collect an AC. The remote caller is prompted to enter the AC which is validated against the AC table of, for example, FIGS. 8A and 8B to gain access to the AIN arrangement of the present invention.

Yet another screening option may require both a valid CPN and AC. Under this screening option, the remote caller's CPN is verified using, for example, the CPN table of FIG. 7, after which the remote caller is prompted for an AC to access the present invention. The AC is verified using, for example, the authorization code table of FIG. 8A. It is also possible to provide a single CPN and AC authorization table to authorize the remote caller's access to the private network.

Row 3 of the trigger template in FIG. 3 allows a subscriber to predefine CPN options. In SSPs which comprise DMS-100 and 5ESS type switches, there may be three CPN options: CPN Required, CPN Not Required, and CPN Provided. If the CPN is required, the remote caller will be prevented from accessing the present invention if no CPN is present at the RAF-SSP where the remote caller attempts to access the present invention. If the CPN is not required, then the remote caller may access the present invention without consideration of the CPN being present at the RAF-SSP. In the CPN provided case, as discussed above, where the CPN is not present, a CPN will be provided to the present invention by correlating the remote caller's AC to a CPN. Referring to FIG. 8A, once a caller enters a valid AC, the associated CPN shown in the right-hand column is used by the subscriber for other purposes such as billing when the subscriber additionally specifies PRI trunks. For example, if the remote caller enters 799567 as an AC, the CPN 3145550687 will be provided and used in the network system of the present invention.

In those SSPs which comprise a 1AESS type switch, the CPN provided option may not be available. Thus, the only CPN options for the 1AESS SSP are: CPN Required or CPN Not Required.

Row 4 indicates the type of switch serving as the RAF-SSP. The valid options may be 1AESS, DMS-100 and 5ESS. As noted in FIG. 3, and discussed hereinbefore, the DMS-100 and 5ESS switches are functionally equivalent.

Rows 5–10 define the subscribers trunk configuration and routing options. The trunk configuration options, as noted above, may be MF or PRI, and indicate the type of signaling used on a particular trunk. According to the trigger template of FIG. 3, a value of "2" in rows 5, 7 and 9 may be used to indicate a MF signaling trunk, and a value of "1" may be used to indicate a trunk capable of PRI signaling. Rows 6, 8 and 10 are used to indicate the trunk routing options, which may be an office route number (ORN used for routing purposes in DMS-100 switches) or route index (RI used for routing purposes in 1AESS and 5ESS switches) to route a call placed by the remote caller to a terminating number, such as a telephone number, on the private network. As shown in the exemplary trigger template of FIG. 3, an entry of "00000000" indicates that the subscriber has not defined a routing for a particular trunk group, or that the subscriber's private network does not include the particular trunk group. In accordance with the present invention, the subscriber may define a primary trunk group, alternate trunk group, and a second alternate trunk group to route calls from the RAF-SSP to the destination telephone. The subscriber may define only a primary trunk group, a primary trunk group and an alternate trunk group, or a primary trunk group, an alternate trunk group and second alternate trunk group to route calls.

According to the present invention, the trunk routing options may route calls from a RAF-SSP served by 5ESS and DMS-100 switches to a CO served by 1AESS, 5ESS or DMS-100 switches via MF trunks; a PBX via MF trunks; a CO served by 5ESS or DMS-100 switches via PRI trunks; or a PBX having PRI capabilities via PRI trunks. The trunk routing options may also route calls from a RAF-SSP served by 1AESS switches to a CO served by 1AESS, 5ESS or DMS-100 switches via MF trunks; or a PBX via MF trunks.

Although not shown in the trigger template in FIG. 3, it is also possible to screen calls based on the CDN. For example, a subscriber may define that a particular remote caller, identified by CPN and/or AC may terminate to a limited number of predefined telephone numbers on the private network. The predefined telephone numbers may be within the NANP or may alternatively include international-type calls placed within a private network.

Referring again to FIG. 2, at step 206, control is passed to the group CPR based on the type of trigger (e.g., TAT, DLN or 10D) encountered at the RAF-SSP. The CPR is processed at the SCP and responses (e.g., routing instructions, and announcement instructions) are passed from the SCP to the RAF-SSP over the CCS links in TCAP format. The group CPR contains the call flow processing logic defining the sequence and interaction of the various screening options, CPN options, announcements provided to the remote caller, service measurement handoff, and eventual return of control to the RAF-SSP. The various screening options associated with the group CPR for each of the switches will be discussed later with reference to FIGS. 4A–4E, and 5A–5E.

Figure 6A:
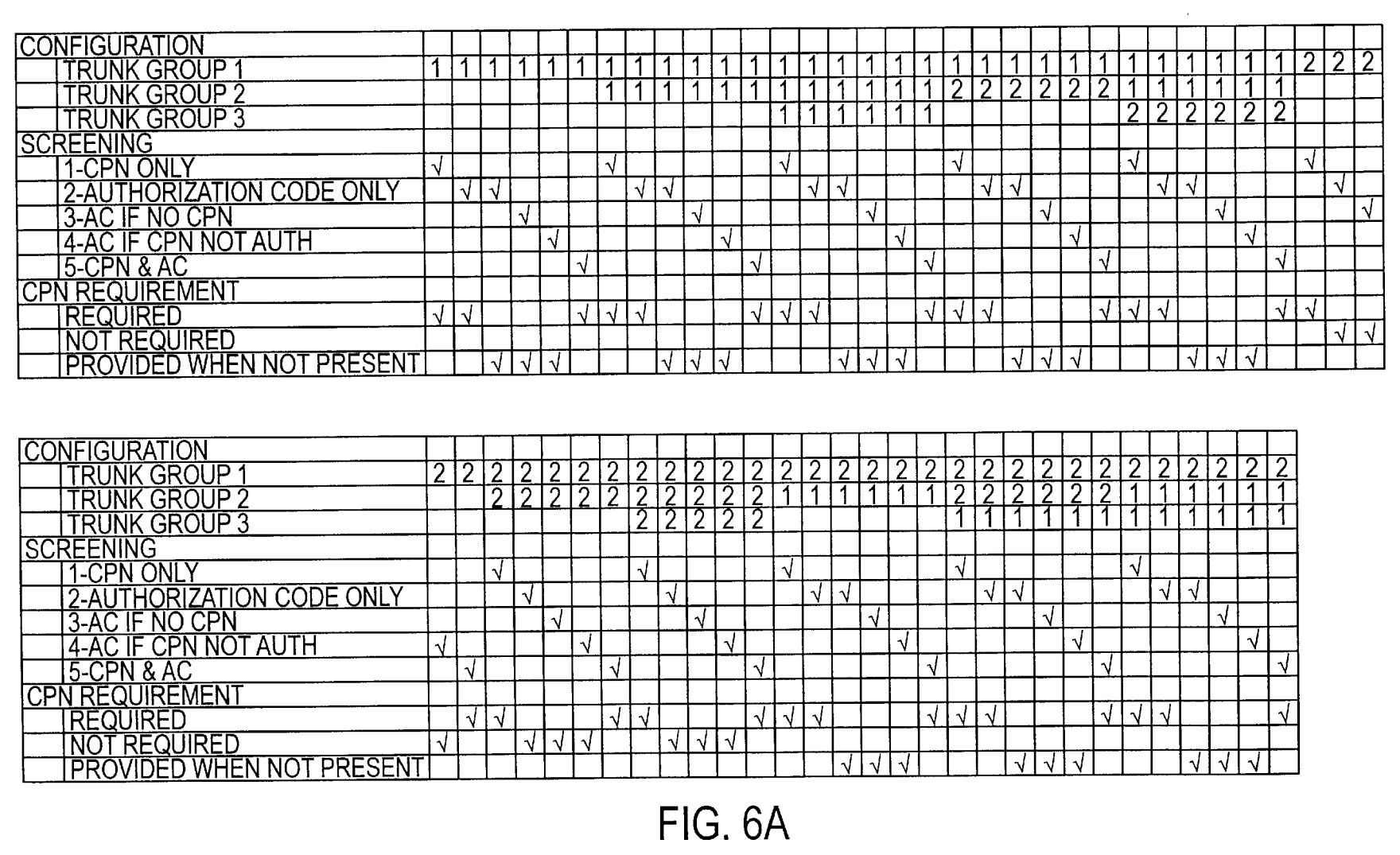

Referring to FIGS. 6A and 6B, there are certain "logical" groupings of trunk type, screening options and CPN options which may be defined in order to simplify the service logic for the DMS-100, 5ESS and 1AESS switches. FIG. 6A is an exemplary table of valid combinations for the DMS-100 and 5ESS switches, and FIG. 6B is an exemplary table for 1AESS switches. The term "logical" is used to indicate that there are only certain combinations of screening options and CPN requirements which produce a valid result. For example, referring to FIGS. 6A and 6B, if the subscriber's screening option is CPN Only, the CPN must be required, or the screening will be ineffective. Thus, there is no "logical" grouping of CPN Only and CPN Not Required. Similarly, is the subscriber's screening option is CPN and AC, the CPN must be required, or the screening will be ineffective. Thus, for this option also, there is no "logical" grouping of CPN and AC, and CPN not required. As another example, if the subscriber's option is AC if no CPN, there is no "logical" grouping of this option with CPN required, as inherently there is no CPN present at the RAF-SSP.

At step 208 in FIG. 2, service measurements are performed for determining the disposition of a particular call for determining usage requirements and errors. After completion of a call, control is passed back to the group CPR (step 206) from the service measurement operation to end the call. After the return to step 206, control is passed to the RAF-SSP at step 210, and the remote call to the RAF-SSP is disconnected, thus ending the remote access session according to the present invention.

While the present invention has been described as processing the RAF CPR at the SCP, it is possible that the service logic associated with a particular RAF TN could be located and process at the RAF-SSP.

Referring now to FIGS. 4A–4E, there are illustrated flow charts of an exemplary call flow for AIN Release 0.1 equipped DMS-100, 1AESS and 5ESS serving as RAF-SSPs.

As noted with regard to FIG. 2, at step 205, the SCP executes the appropriate trigger template in accordance with the RAF-SSP switch type and AIN Release version (e.g., Release 0.0 or 0.1) Steps 400 and 402 indicate the transfer from the trigger template to step 404, where it is determined if the options, i.e., screening option and CPN option, are compatible. As noted above, the compatible options may be defined in a table as shown in FIGS. 6A and 6B. If the subscriber has defined nonsensical option requirements (e.g., CPN Only screening and CPN Not Required), the remote caller is prompted to contact repair service at step 406 to rectify the incompatibility. If the screening options and the CPN options are logical, then at step 408, security screening is performed in accordance with the subscriber's screening options and CPN option.

The security screening is shown with greater detail in FIGS. 4B–4E, where at step 424, the subscriber's screening option is determined, as defined in the trigger template (see, for example, FIG. 3). If the screening option is "1" (CPN required), then at step 426, the remote caller's CPN is verified by the SCP. As noted previously, in the CPN Required screening option, the CPN is required. The SCP returns either a success or failure to the CPR at step 428.

If at step 424 it is determined that the subscriber's screening option is "2" (AC Only), control flows to step 430 where the subscriber's CPN option is determined. If the subscriber has selected CPN Required, then at step 446, it is determined if the remote caller's CPN is present. If the CPN is not present, then at step 448 a failure is returned to the CPR.

If at step 446 the remote caller's CPN is present, or in the case where a subscriber has selected CPN Not Required, or CPN Provided at step 430, the SCP instructs the SSP to play an announcement to prompt the caller to enter an AC at step 432. The remote caller enters the AC at step 434, which is collected by the SSP and verified by the SCP at step 435. If the entered AC is valid, and the subscriber's CPN option is CPN Required or CPN Not Required as a CPN option, a success is returned to the CPR at step 442.

If it is determined at step 435 that the remote caller's AC is valid and the subscriber has selected CPN provided as the CPN option, then at step 436, it is determined if the CPN exists. If no CPN exists, then at step 437 it is determined if the AC table (see, for example, FIG. 8A) contains an entry for the Provided CPN for the entered AC. A Provided CPN is used by the service logic if needed (e.g., no CPN is present, or an invalid CPN is present). If the AC table does contain an entry for the Provided CPN, then at step 440 a success and the Provided CPN is returned to the CPR. However, if the Provided CPN column is blank, or contains an otherwise invalid CPN, the SCP instructs the SSP at step 441 to play an announcement, for example, to contact repair personnel, and the call is ended. If a CPN exists at step 436, then at step 442, a success is returned.

If at step 435, the caller's AC is invalid, the SCP determines the number of attempts the remote caller has used to enter a valid AC at step 438. If the number of attempts is less than three, the SCP instructs the SSP to play an announcement at step 432 to the remote caller to re-enter the AC, which is entered and verified in accordance with steps 434 and 435. However, if the number of attempts is greater than three, a failure is returned to the CPR at step 444. While the number of attempts to enter a valid AC has been described as three, it is possible to provide a remote caller with a fewer or greater number of attempts to enter a valid AC.

If at step 424 it is determined that the screening option is "3", "4" or "5", control passes to point "A" (FIG. 4C), "B" (FIG. 4D) or "C" (FIG. 4E), respectively.

Figure 4A:
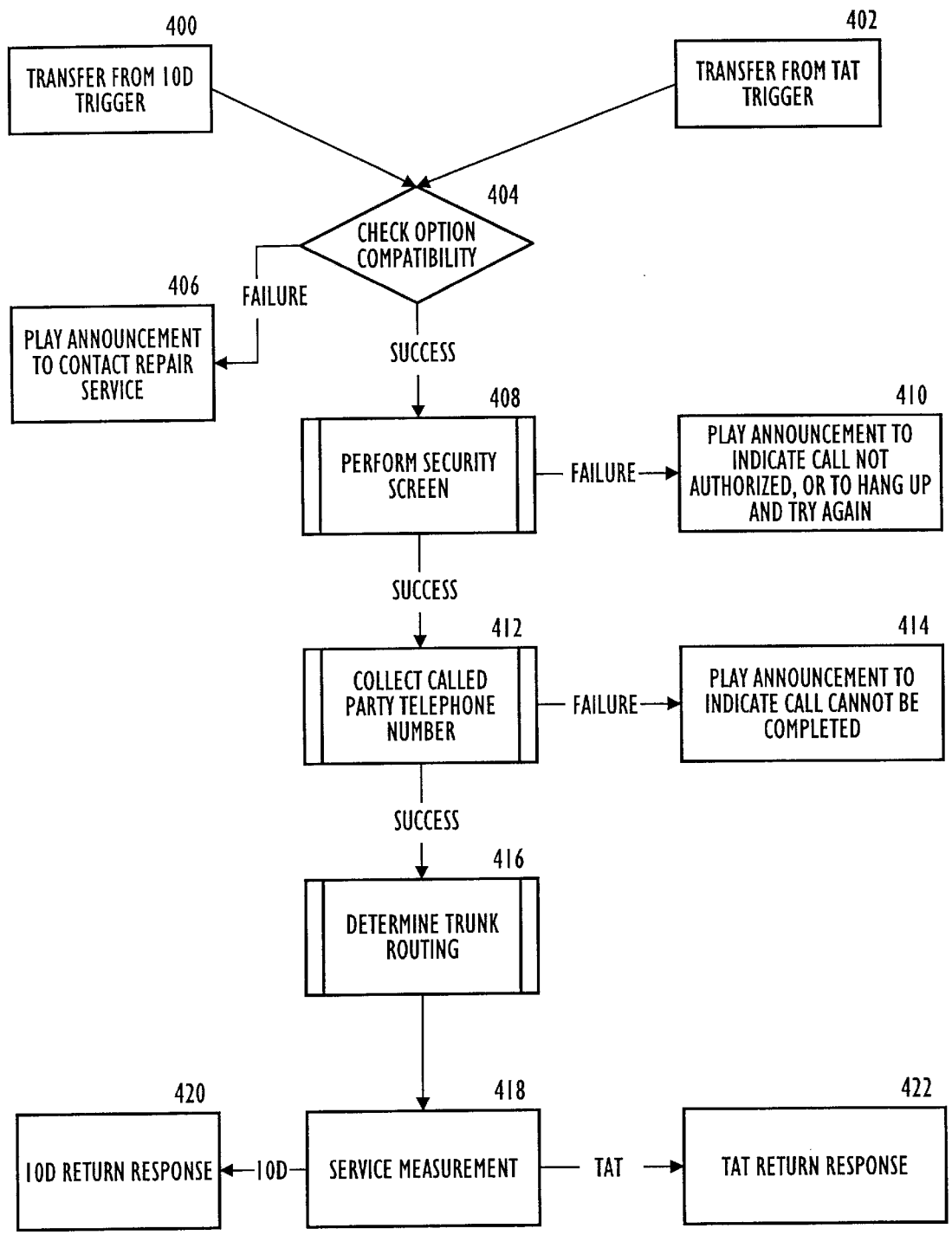
FIG. 4A illustrates an exemplary flow diagram of call processing under AIN Release 0.1 protocols.
Figure 4B:
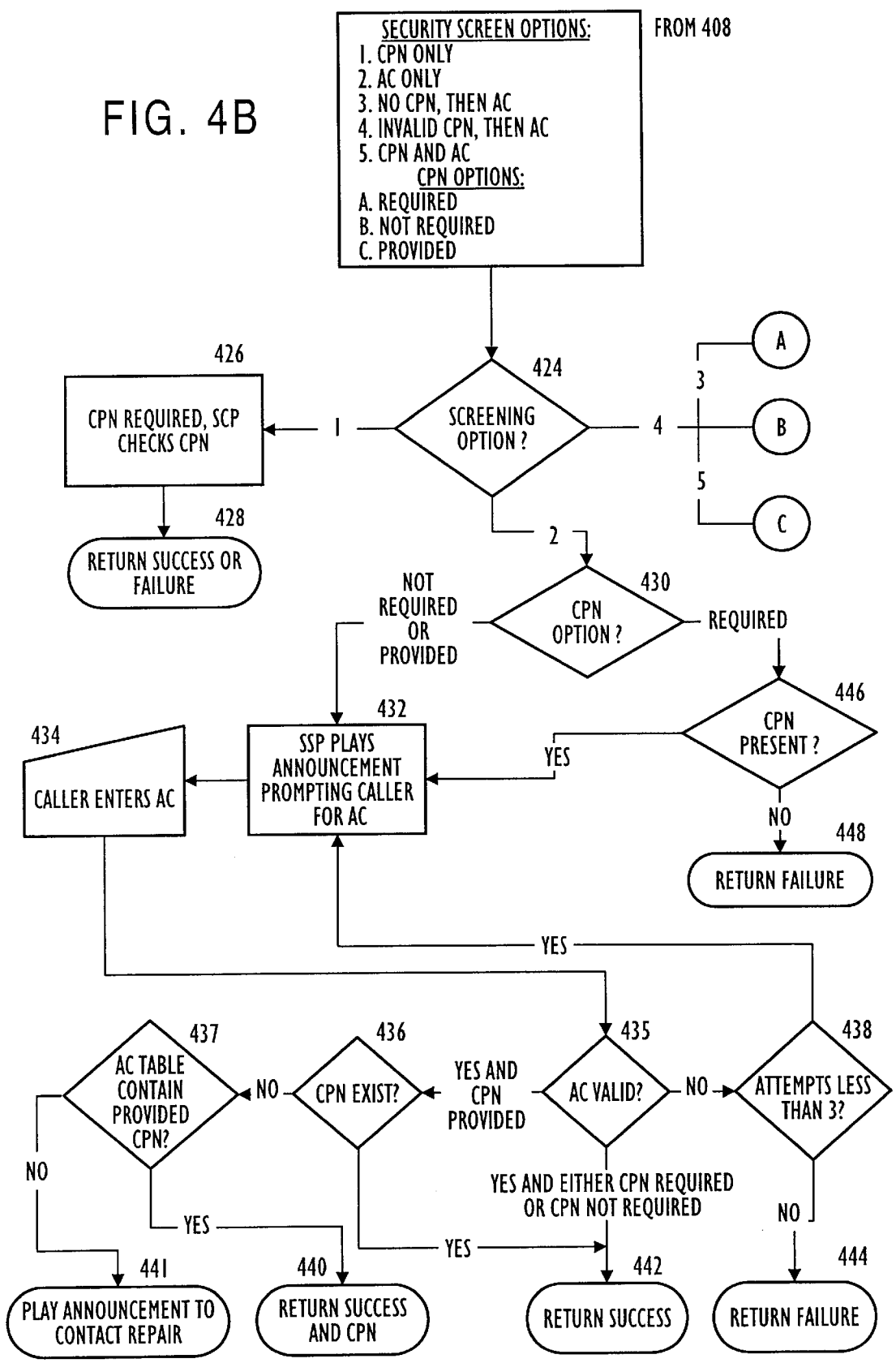
FIGS. 4B, 4C, 4D and 4E illustrate an exemplary flow diagram of call processing for security screening under AIN Release 0.1 protocols.
Figure 4C:
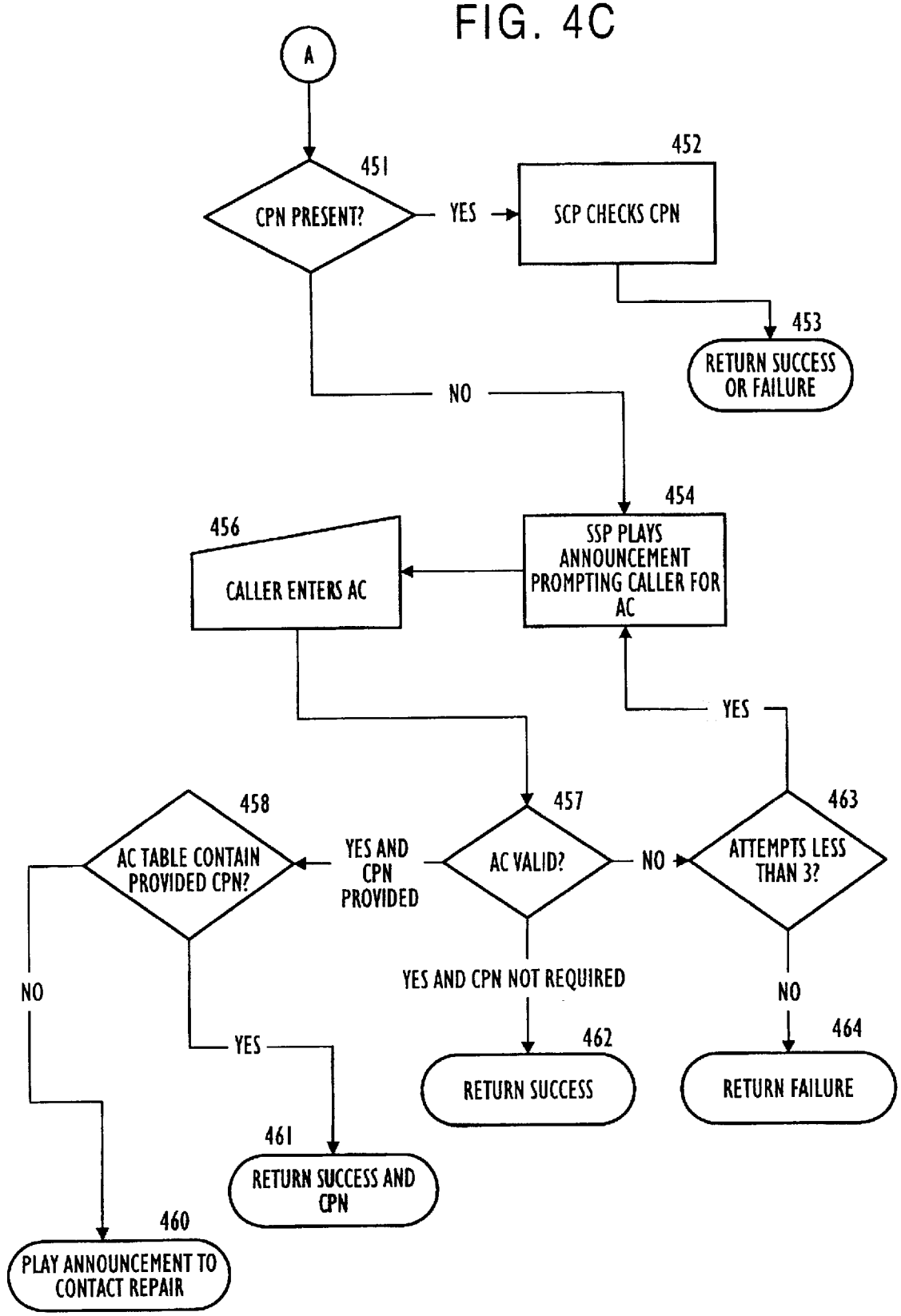

In FIG. 4C, there is shown an exemplary call flow logic for a screening option which allows the caller to enter an AC if no CPN is present. Control passes from point "A" in FIG. 4B to step 451, where the SCP determines if the CPN is present. If the CPN is present, then at step 452, the SCP validates the CPN in accordance with the authorized CPNs (see, for example, FIG. 7). If the CPN is validated at step 452, i.e., there is correspondence with an authorized CPN listed in the table of FIG. 7, then a success is returned at step 453, otherwise, if the CPN is not validated, a failure is returned at step 453.

If the CPN is not present at step 451, then the SCP at step 454 instructs the SSP to play an announcement to prompt the remote caller for an AC. The remote caller enters the AC at step 456, and the SCP validates the AC at step 457 by determining if the entered AC corresponds to one of the ACs on the list of authorized ACs (see, for example, FIG. 8B). If the entered AC is valid, and the subscriber has selected CPN Not Required as a CPN Option, a success is returned at step 462. If the entered AC is invalid, then at step 463, the SCP determines if the number of attempts to enter a valid AC is less than three. If the number of attempts is less than three, the remote caller is prompted at step 454 to re-enter the AC in accordance with steps 456 and 457. If the number of attempts is greater than or equal to three, then a failure is returned at step 464. If at step 457 the AC is valid, and the subscriber has selected CPN Provided as a CPN Option, then at step 458, the SCP determines if the AC table (see, for example, FIG. 8B) contains a Provided CPN for the entered AC. If no CPN is associated with the entered AC, then at step 460, the SCP may instruct the SSP to play an announcement to contact repair personnel, and the call is ended. If there is an associated CPN to the entered AC, then at step 461, a success and the Provided CPN are returned.

Figure 4D:
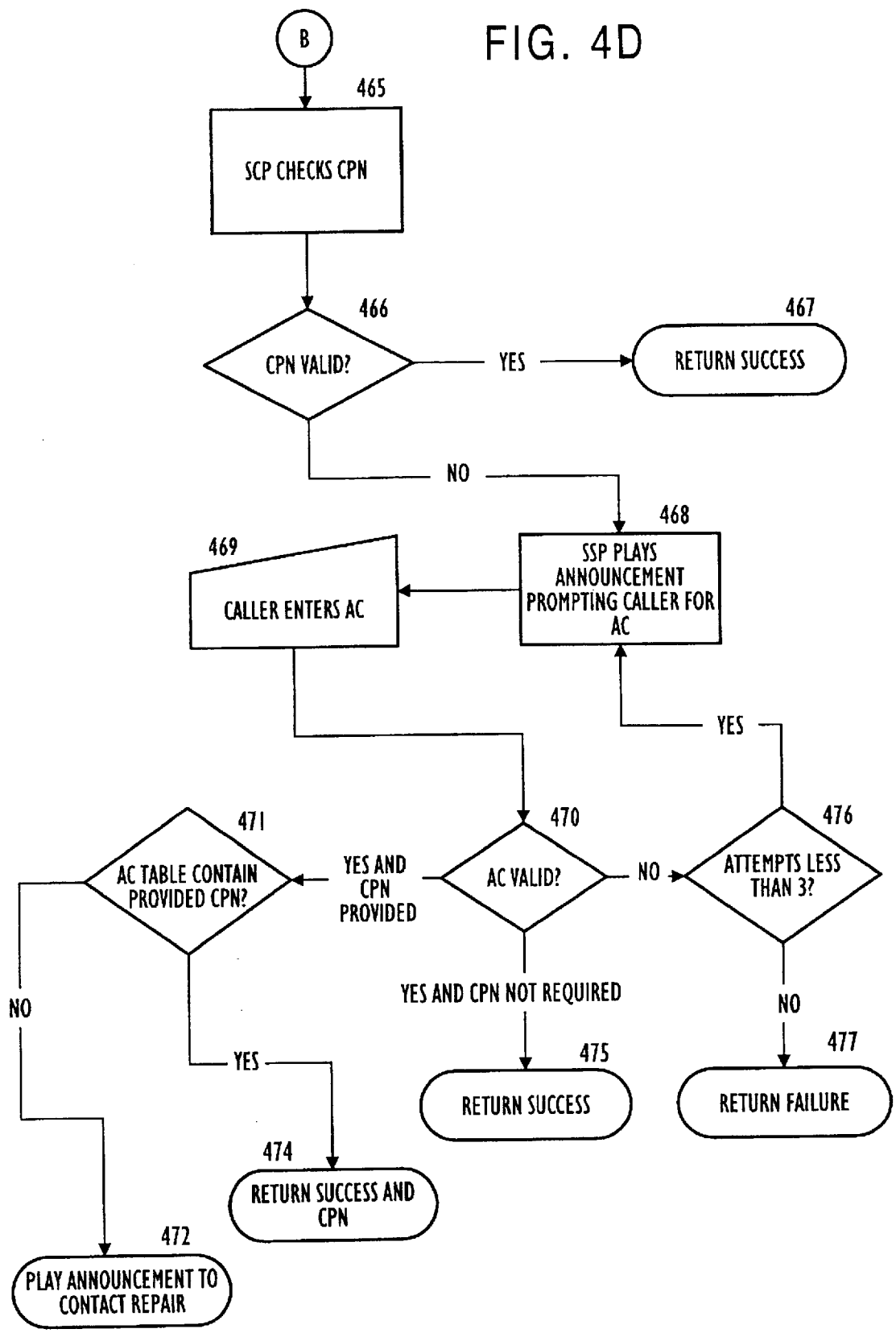

In FIG. 4D, there is shown an exemplary call flow logic for a screening option which allows the caller to enter an AC if the CPN is invalid. Control passes from point "B" in FIG. 4B to step 465, where the SCP checks the CPN and then determines if the CPN is valid at step 466. The SCP validates the CPN in accordance with the authorized CPNs (see, for example, FIG. 7). If the CPN is validated at step 466, i.e., an authorized CPN listed in the table of FIG. 7, then at step 467, a success is returned.

If the CPN is determined to be not valid at step 466, the SCP at step 468 instructs the SSP to play an announcement to prompt the remote caller for an AC. The remote caller enters the AC at step 469, and the SCP validates the AC at step 470 by determining if the entered AC corresponds to one of the ACs on the list of authorized ACs (see, for example, FIG. 8B). If the entered AC is valid, and the subscriber has selected CPN Not Required as a CPN Option, a success is returned at step 475. If the entered AC is invalid, then at step 476, the SCP determines if the number of attempts to enter a valid AC is less than three. If the number of attempts is less than three, the remote caller is prompted at step 468 to re-enter the AC in accordance with steps 469 and 470. If the number of attempts is greater than or equal to three, then a failure is returned at step 477. If at step 470 the AC is valid, and the subscriber has selected CPN Provided as a CPN Option, then at step 471, the SCP determines if the AC table (see, for example, FIG. 8B) contains a Provided CPN for the entered AC. If no CPN is associated with the entered AC, then at step 472, the SCP may instruct the SSP to play an announcement to contact repair personnel, and the call is ended. If there is an associated CPN to the entered AC, then at step 474, a success and the Provided CPN are returned.

Figure 4E:
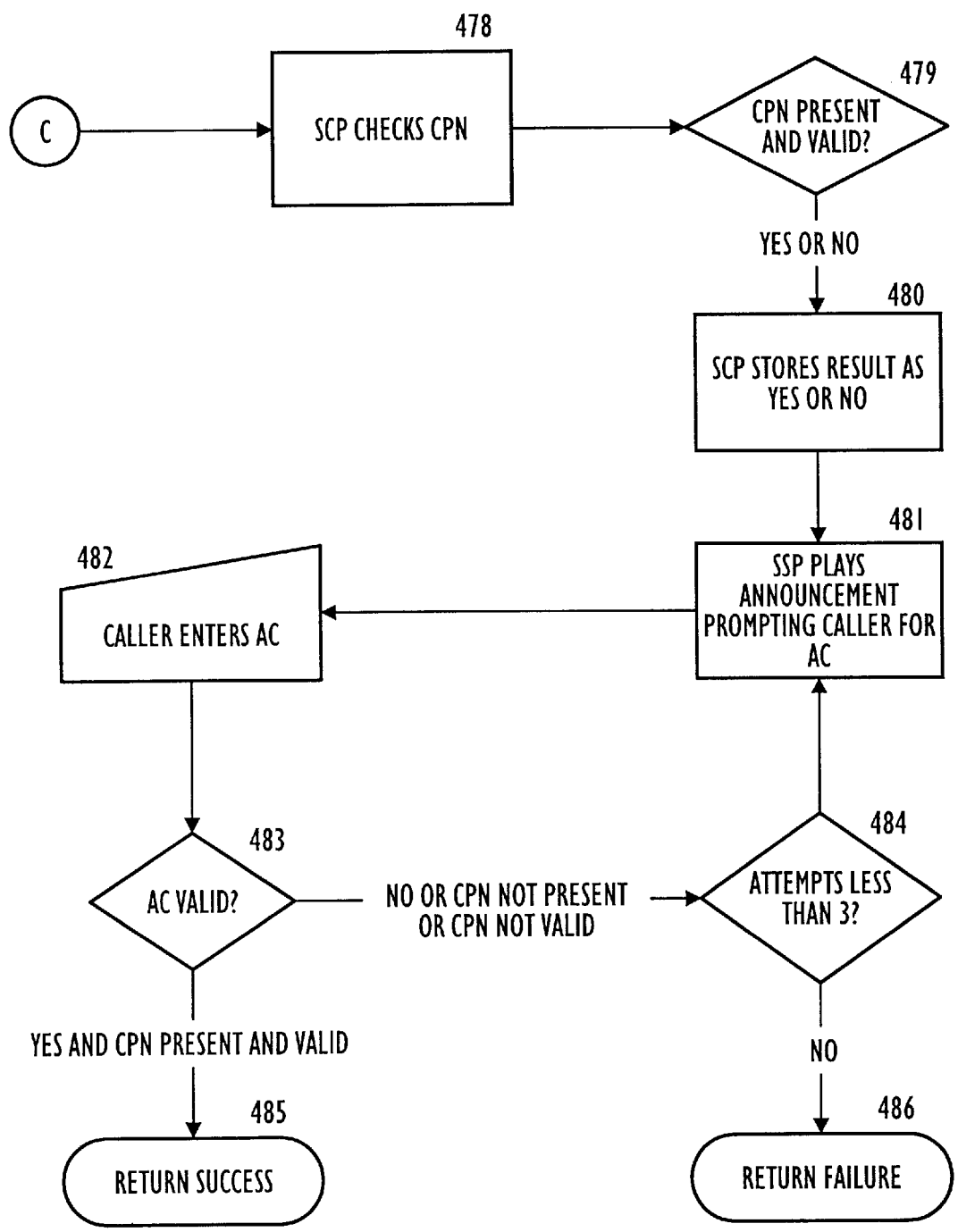

In FIG. 4E, there is shown an exemplary call flow logic for a screening option which requires both a valid AC and CPN. Control passes from point "C" in FIG. 4B to step 478, where the SCP checks the CPN and then determines if the CPN is present and valid at step 479. The SCP validates the CPN at step 479 in accordance with the authorized CPNs (see, for example, FIG. 7). The results of the validation are stored at the SCP at step 480. If the CPN is validated at step 479, i.e., present and an authorized CPN listed in the table of FIG. 7, a "YES" is stored at step 480, otherwise, a "NO" is stored. Step 480 is performed without playing an announcement to the remote caller so that the remote caller will not be able to determine the cause of an authorization failure. Even if the CPN is determined to be not valid, the caller is still prompted for an AC after step 480. As a result, the remote caller will not be able to determine if an invalid CPN or invalid AC was the cause of the authorization failure.

As shown in FIG. 4E, if the CPN is valid, if the CPN is invalid, or if the CPN is not present, control flows to step 481, where the SCP instructs the SSP to play an announcement to prompt the remote caller for an AC. The remote caller enters the AC at step 482, and the SCP validates the AC at step 483 by determining if the entered AC matches one of the ACs on the list of authorized ACs (see, for example, FIG. 8B). If the entered AC is valid, and the result stored at step 480 is "YES", then a success is returned at step 485. If the entered AC is invalid, or the result stored at step 480 is "NO", then at step 484, the SCP determines if the number of attempts to enter a valid AC is less than three. If the number of attempts is less than three, the remote caller is prompted at step 481 to re-enter the AC in accordance with steps 482 and 483. If the number of attempts is greater than or equal to three, then a failure is returned at step 486.

Returning again to step 408 in FIG. 4A, if after performing the security screen operation, a failure was returned by the SCP to the CPR, as described with regard to FIGS. 4B–4E, control passes to step 410, where the RAF-SSP will play an announcement to the remote caller to indicate that the call is not authorized, or alternatively to hang up and try the call again.

If after performing the security screen operation at step 408 the result was a success, control flows to step 412, where the remote caller enters a called party telephone number. The exemplary processes that may be performed at step 412 is shown in greater detail with reference to FIG. 9.

Figure 9:
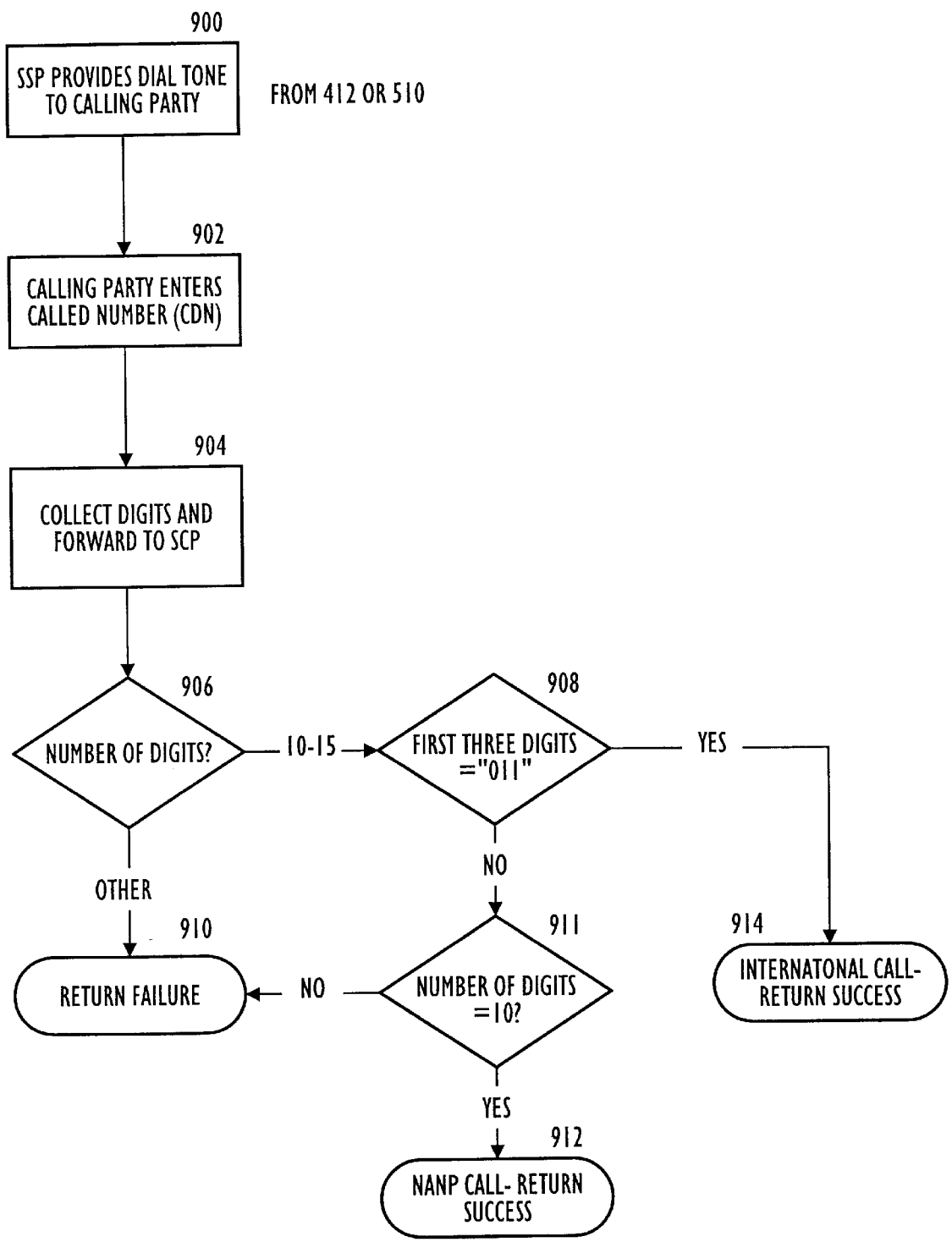
FIG. 9 illustrates an exemplary flow diagram of call processing of a remote caller entering a telephone number.

As shown in FIG. 9, at step 900, the RAF-SSP provides a dial tone to the remote caller, thus prompting the remote caller to enter the digits of the CDN on the private network at step 902. The SSP collects the CDN and forwards the digits to the SCP at step 904. At step 906, the SCP determines the number of digits entered by the remote caller. If the number of digits is between 10 and 15, the SCP determines that CDN is valid and call processing proceeds to step 908. At step 908, the SCP determines if the first three digits of the dialed number are "011", and if so, returns to the CPR a success and that the call is an international call at step 914. If the SCP determines at step 908 that the first three digits are not "011", then at step 911 the SCP determines if the number of digits is equal to ten, then at step 912 the SCP returns to the CPR a success and that the call is a NANP call. If the SCP determines at step 911 that the number of digits is not equal to ten, then a failure is returned at step 910. The SCP will also return a failure message to the CPR at step 910 when it is determined at step 906 the number of entered digits is not between 10 and 15.

Returning again to step 412 of FIG. 4A, if a failure was returned, the SCP instructs the SSP to play an announcement at step 414 indicating that the call cannot be completed as dialed. If a success was returned at step 412, the processing flow continues at step 416, where the SCP determines the trunk routing as defined by the private network subscriber. The process of determining the trunk routing will be described with greater detail with reference to FIG. 10.

Figure 10:
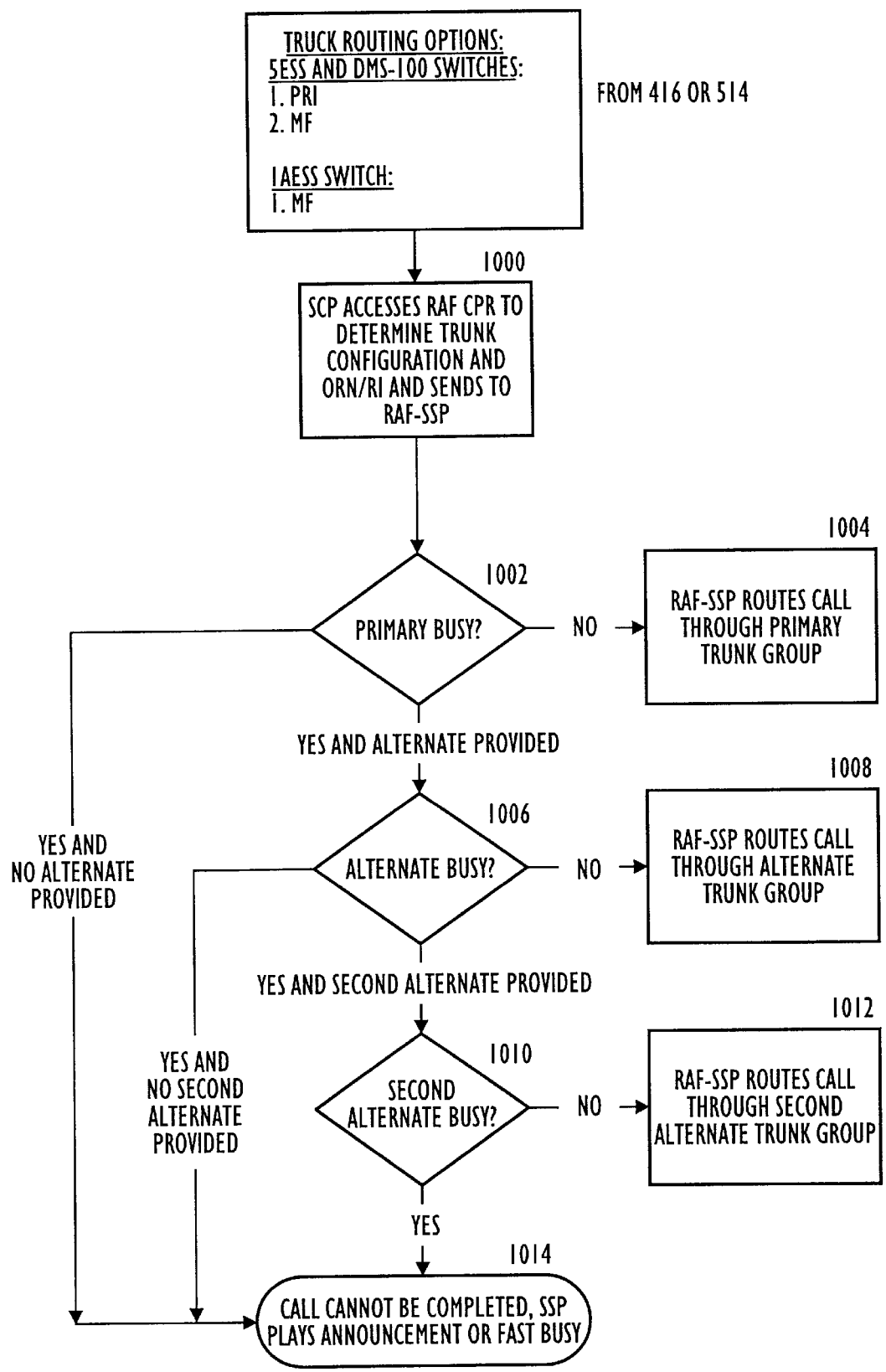
FIG. 10 illustrates an exemplary flow diagram for determining trunk routing.
Figure 11:
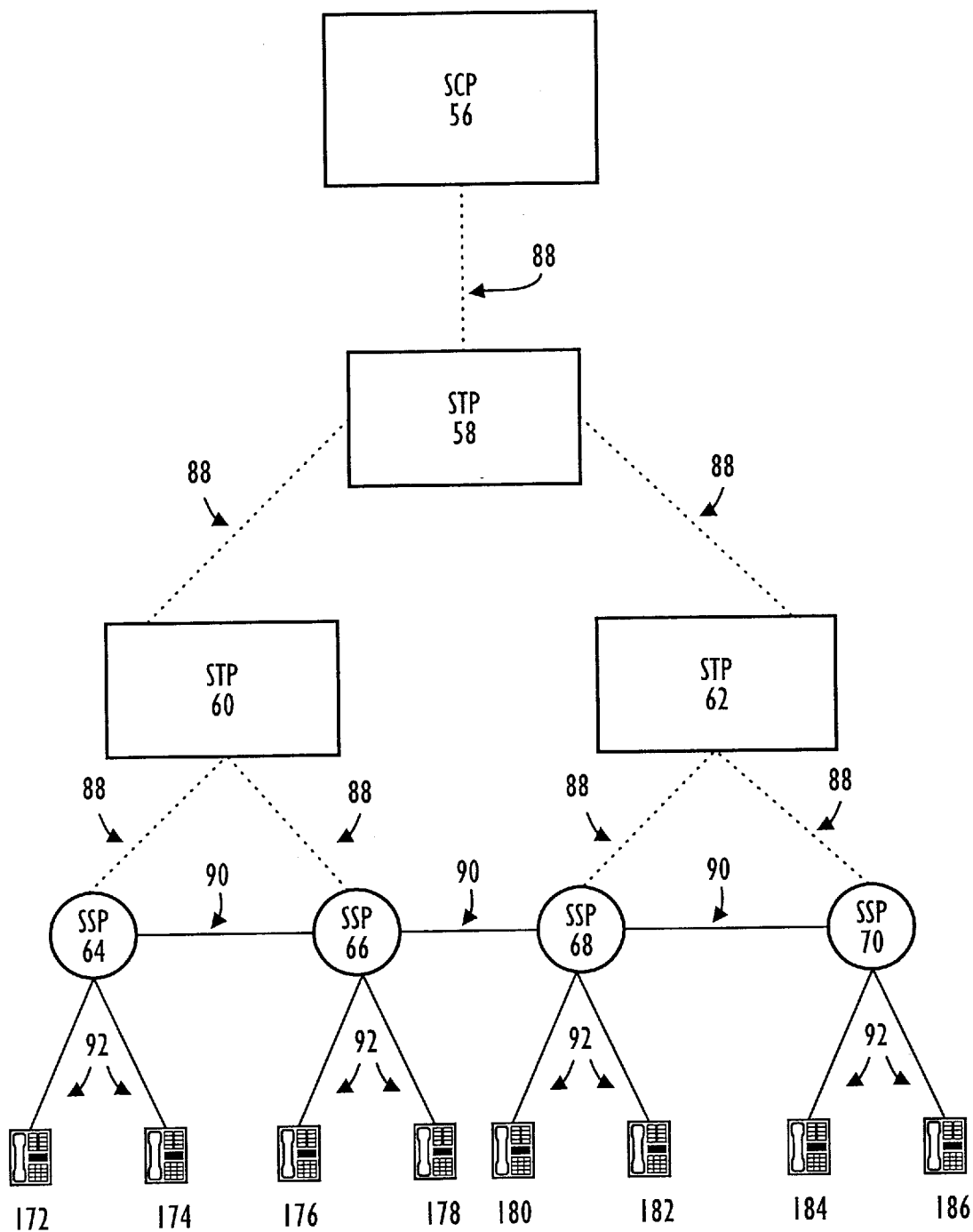
FIG. 11 illustrates an exemplary block diagram of the basic components of an Advanced Intelligent Network (AIN) system.

As shown in FIG. 10, the trunk type is determined in accordance with the type of switch serving as the RAF-SSP. As previously indicated, if the switch is a DMS-100 or 5ESS, the valid trunking options are PRI and MF. However, if the switch is a 1AESS switch, the trunking type is MF.

At step 1000, the SCP determines the trunk configuration (e.g., PRI and MF for DMS-100 and 5ESS switches, or MF for DMS-100, 5ESS and 1AESS switches) and ORN/RI by accessing the RAF CPR. As noted above, the subscriber may define a primary trunk group, an alternate trunk group, and a second alternate trunk group to route calls (see, for example, FIG. 3). At step 1000, the SCP determines all of the subscriber predefined routes based on a value different than "00000000" in rows 6, 8 and 10 in the exemplary trigger template shown in FIG. 3. That is, if the ORN/RI is not equal to "00000000", then that possible route is good. The SCP may send all of the predefined routes to the RAF-SSP at one time so that the RAF-SSP can determine an available route. At step 1002, the RAF-SSP determines if the primary trunk group is busy. If the primary trunk group is not busy, the RAF-SSP routes the call through the primary trunk group at step 1004. If the primary trunk is busy, then the RAF-SSP determines if the subscriber has defined an alternate trunk group (as sent by the SCP at step 1000). If no alternate trunk group is defined, then at step 1014 the RAF-SSP plays an announcement that the call cannot be completed, or in the alternative, plays a "fast busy" signal to the remote caller.

If the subscriber has defined an alternate trunk group, then at step 1006, the RAF-SSP determines if the alternate trunk group is busy. If the alternate trunk group is not busy, the RAF-SSP routes the call through the alternate trunk group at step 1008. If the alternate trunk is busy, then the RAF-SSP determines if the subscriber has defined a second alternate trunk group (as sent by the SCP at step 1000). If no second alternate trunk group is defined, then at step 1014 the RAF-SSP plays an announcement that the call cannot be completed, or in the alternative, plays a "fast busy" signal to the remote caller.

If the subscriber has defined a second alternate trunk group, then at step 1010, the RAF-SSP determines if the second alternate trunk group is busy. If the second alternate trunk group is not busy, RAF-SSP routes the call through the second alternate trunk group at step 1012. If the second alternate trunk is busy, then at step 1014, the RAF-SSP plays an announcement that the call cannot be completed, or in the alternative, plays a "fast busy" signal to the remote caller.

In accordance with an aspect of the present invention, the RAF-SSP may determine whether a trunk is busy utilizing standard polling techniques to evaluate the status of the lines of the trunk. In such a case, the RAF-SSP "polls" the status of each line in a trunk, and maintains a status list that includes the status of that trunk and all other trunks connected to the switch. The polled status of a trunk may be either "busy" or "idle" based on traffic present on the lines of the trunk. The RAF-SSP will route a call to an idle line in the first idle trunk on the status list, or as described above, the primary trunk group. If the primary trunk is not available, then the RAF-SSP will route the call to an available alternate trunk group.

Referring again to FIG. 4A, after the trunk routine is determined at step 416, the CPR hands-off the processing to a service measurement operation. The service measurement is performed at the SCP to determine how much SCP resources are being used by the remote access service feature. Service measurement peg counts may be used to determine the amount of time and SCP resources that are used by the remote access feature. The total amount of usage by the service feature may be utilized for different purposes, including matching the total usage amount against engineering projections and making any necessary modifications to the SCP's resources or capacities.

After the call is complete and service measurements are performed at step 418, control is returned to the appropriate trigger which called the CPR at either step 420 (10D) or step 422 (TAT).

As noted above with regard to FIG. 2, when control is returned to the RAF-SSP after the completion of the call, remote access to the private network as facilitated by the present invention is completed.

As discussed above, the present invention advantageously provides a subscriber with a plurality of screening options to authorize off-network remote callers, and trunk routings to terminate calls placed by remote callers to telephone numbers located on the private network. Additionally, by providing a CPN when none is present or if the CPN is invalid, the appropriate department may be billed for the call placed by the remote caller.

Referring now to FIGS. 5A–5E, there are illustrated flow charts of an exemplary call logic flow for AIN Release 0.0 equipped 1AESS SSPs.

As noted with regard to FIG. 2, at step 204, the RAF-SSP executes the appropriate trigger template in accordance with the RAF-SSP switch type and AIN Release version (e.g., 0.0 or 0.1). Step 500 indicates the transfer from the trigger template to step 502, where it is determined if the options, i.e., screening option and CPN option, are compatible. As noted above, the compatible options are shown in FIG. 6B for a 1AESS switch. If the subscriber has defined nonsensical option requirements (e.g., CPN Only screening, and CPN Not Required), the remote caller is prompted to contact repair service personnel at step 504 to rectify the incompatibility. If the screening options and the CPN options are logical, then at step 506, security screening is performed in accordance with the subscriber's screening options and CPN option. Under certain conditions, such as 1AESS equipped switches, the CPN option of CPN Provided may not be available. Thus, an authorization table such as that shown in FIG. 8B may be used. Optionally, the exemplary authorization table of FIG. 8A may be used. In this case, the "Provided CPN" associated with each of the ACs is ignored by the CPR during call processing.

The security screening is shown with greater detail in FIGS. 5B–5E, where at step 520, the subscriber's screening option is determined, as defined in the trigger template (see, for example, FIG. 3). If the screening option is "1" (CPN required), then at step 522, the remote caller's CPN is verified by the SCP. As noted previously, in the CPN Required screening option, the CPN is required. The SCP returns either a success or failure to the CPR at step 524.

If at step 520 it is determined that the subscriber's screening option is "2" (AC Only), control flows to step 526 where SCP instructs the SSP to play an announcement to prompt the caller to enter an AC. The remote caller enters the AC at step 528, which is collected by the SSP and verified by the SCP at step 530. If the entered AC is valid, and the subscriber's CPN option is CPN Required or CPN Not Required as a CPN option, a success is returned to the CPR at step 534.

If at step 530, the caller's AC is invalid, the SCP determines the number of attempts the remote caller has used to enter a valid AC at step 532. If the number of attempts is less than three, the SCP instructs the SSP to play an announcement at step 526 to the remote caller to re-enter the AC, which is entered and verified in accordance with steps 528 and 530. However, if the number of attempts is greater than three, a failure is returned to the CPR at step 536. While the number of attempts to enter a valid AC has been described as three, it is possible to provide a remote caller with a fewer or greater number of attempts to enter a valid AC.

If at step 520 it is determined that the screening option is "3", "4" or "5", control passes to point "D" (FIG. 5C), "E" (FIG. 5D) or "F" (FIG. 5E), respectively.

Figure 5A:
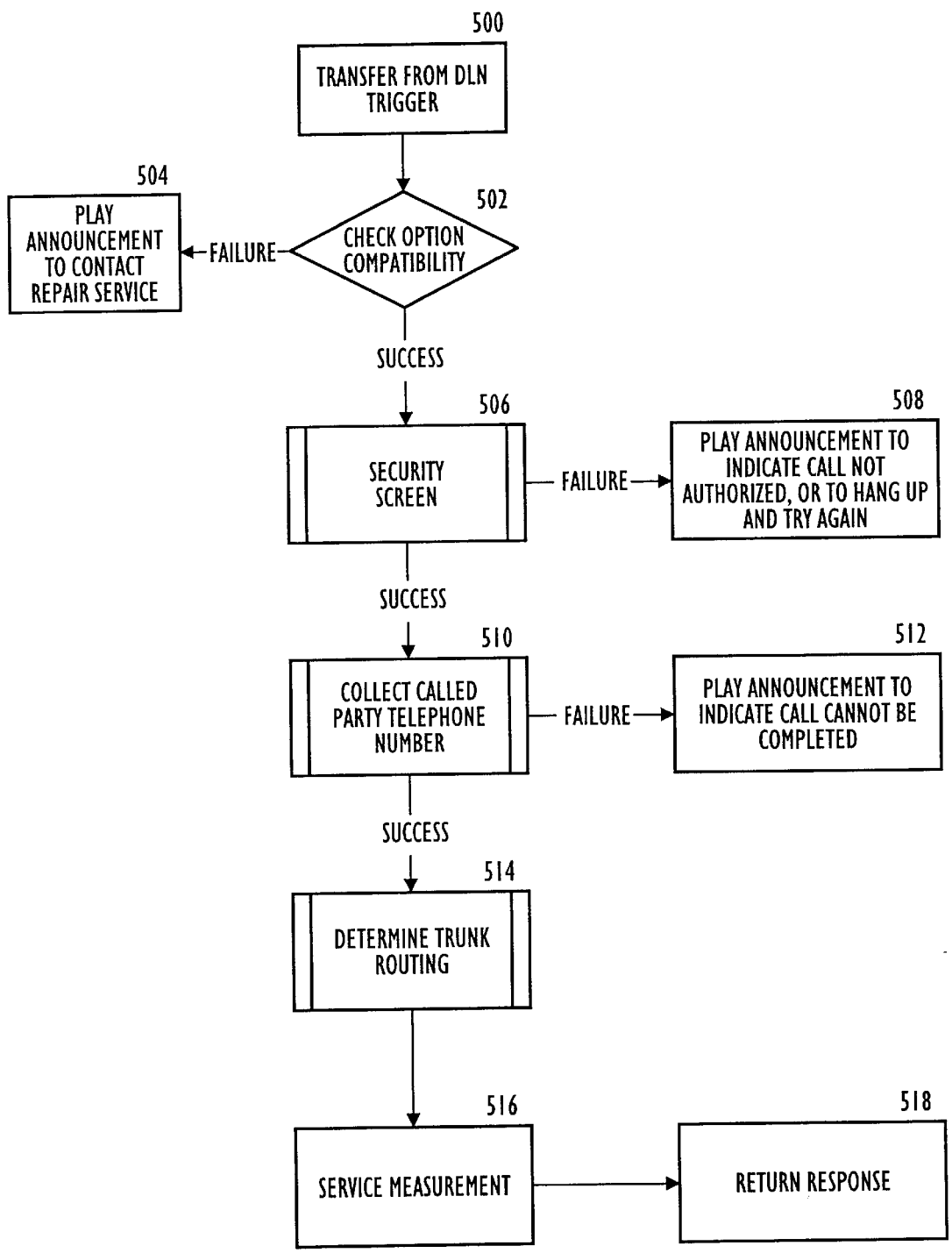
FIG. 5A illustrates an exemplary flow diagram of call processing under AIN Release 0.0 protocols.
Figure 5B:
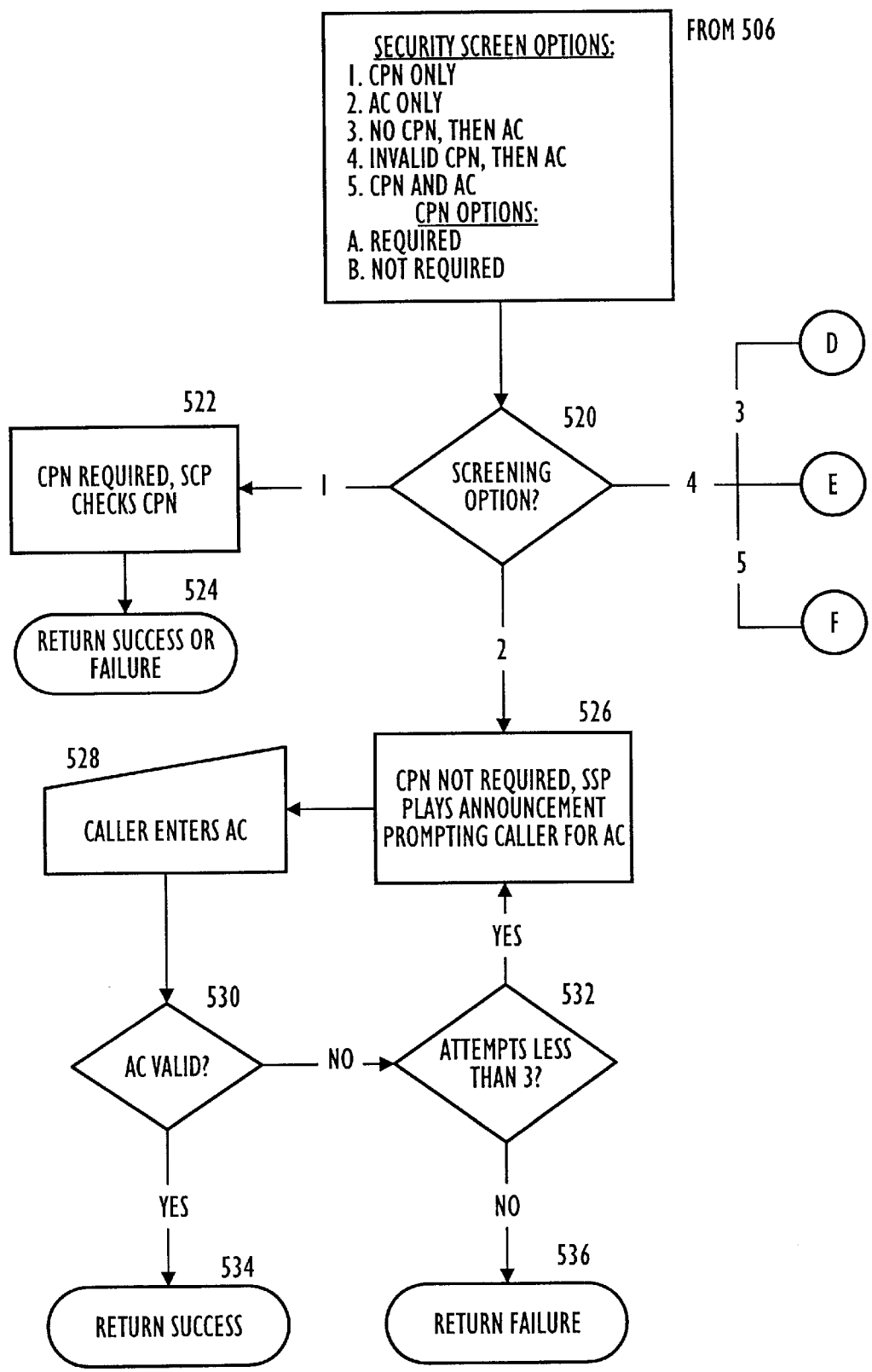
FIGS. 5B, 5C, 5D and 5E illustrate an exemplary flow diagram of call processing for security screening under AIN Release 0.0 protocols.
Figure 5C:
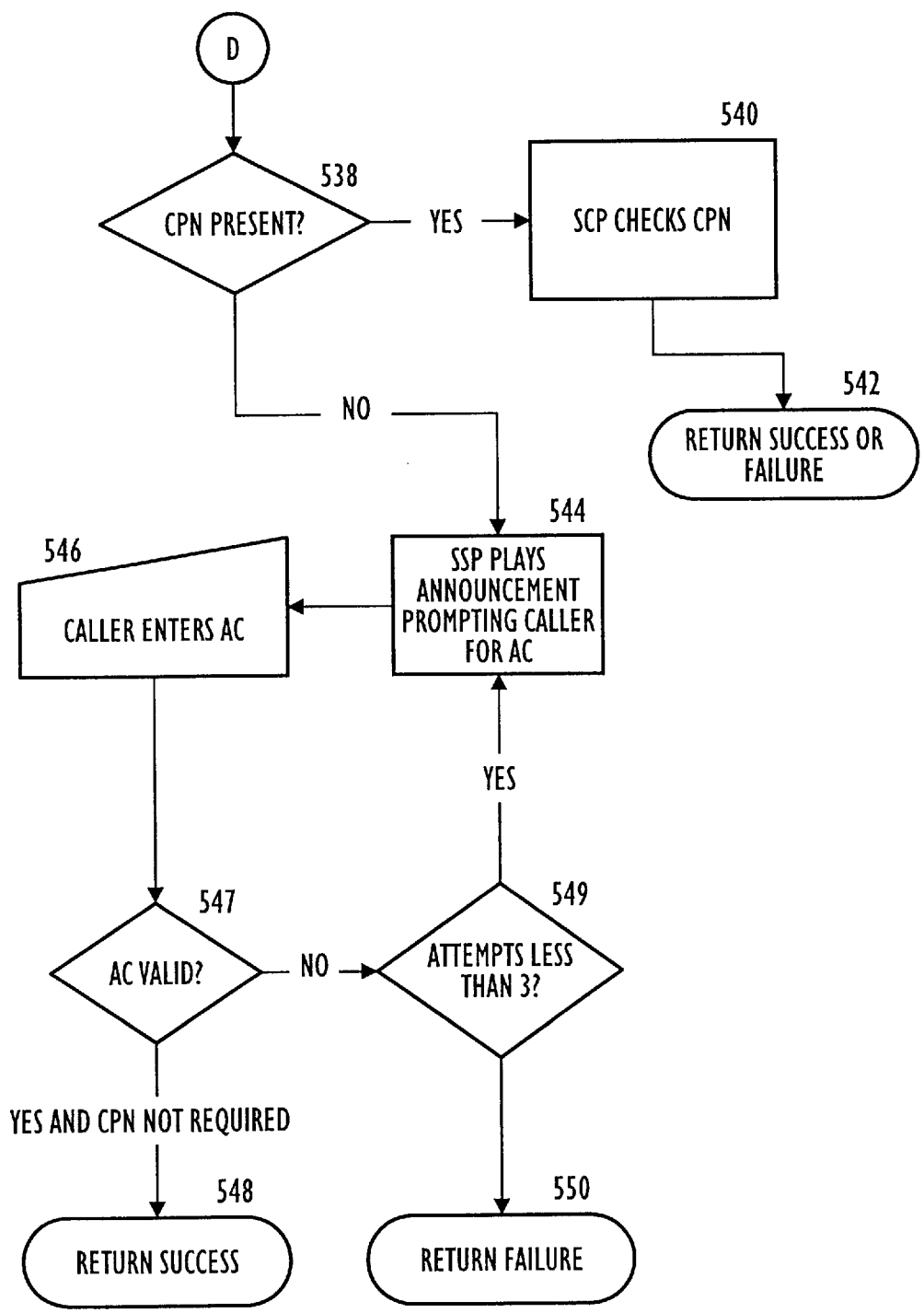

In FIG. 5C, there is shown an exemplary call flow logic for a screening option which allows the caller to enter an AC if no CPN is present. Control passes from point "D" in FIG. 5B to step 538, where the SCP determines if the CPN is present. If the CPN is present, then at step 540, the SCP validates the CPN in accordance with the authorized CPNs (see, for example, FIG. 7). If the CPN is validated at step 540, i.e., there is correspondence with an authorized CPN listed in the table of FIG. 7, then a success is returned at step 542, otherwise, if the CPN is not validated, a failure is returned at step 542.

If the CPN is not present at step 538, then the SCP at step 544 instructs the SSP to play an announcement to prompt the remote caller for an AC. The remote caller enters the AC at step 546, and the SCP validates the AC at step 547 by determining if the entered AC corresponds to one of the ACs on the list of authorized ACs (see, for example, FIGS. 8A and 8B). If the entered AC is valid, and the subscriber has selected CPN Not Required as a CPN Option, a success is returned at step 548. If the entered AC is invalid, then at step 463, the SCP determines if the number of attempts to enter a valid AC is less than three. If the number of attempts is less than three, the remote caller is prompted at step 544 to re-enter the AC in accordance with steps 546 and 547. If the number of attempts is greater than or equal to three, then a failure is returned at step 550.

Figure 5D:
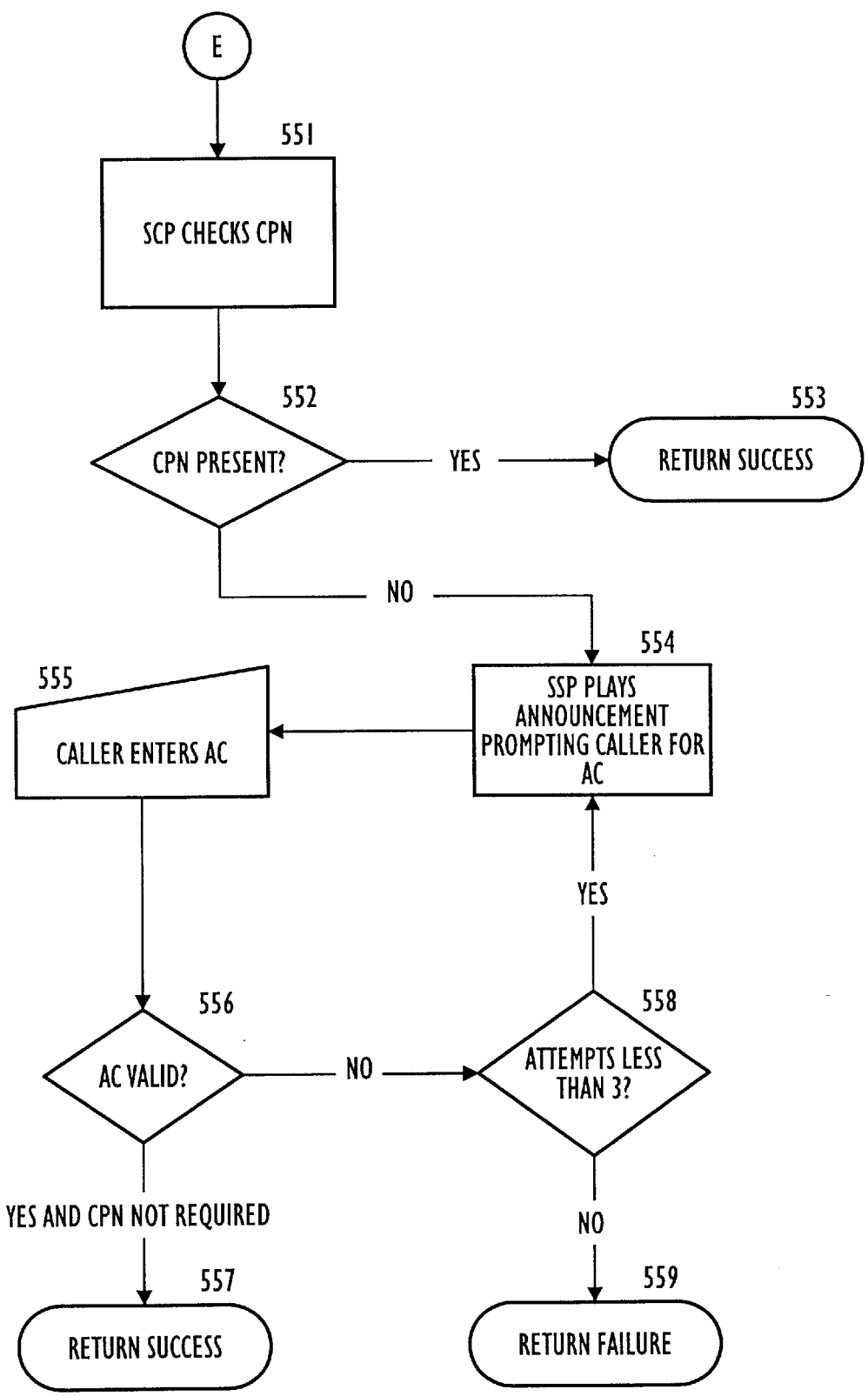

In FIG. 5D, there is shown an exemplary call flow logic for a screening option which allows the caller to enter an AC if the CPN is invalid. Control passes from point "E" in FIG. 5B to step 551, where the SCP checks the CPN and then determines if the CPN is valid at step 552. The SCP validates the CPN in accordance with the authorized CPNs (see, for example, FIG. 7). If the CPN is validated at step 552, i.e., an authorized CPN listed in the table of FIG. 7, then at step 553, a success is returned.

If the CPN is determined to be not valid at step 552, the SCP at step 554 instructs the SSP to play an announcement to prompt the remote caller for an AC. The remote caller enters the AC at step 555, and the SCP validates the AC at step 556 by determining if the entered AC corresponds to one of the ACs on the list of authorized ACs (see, for example, FIGS. 8A and 8B). If the entered AC is valid, and the subscriber has selected CPN Not Required as a CPN Option, a success is returned at step 557. If the entered AC is invalid, then at step 558, the SCP determines if the number of attempts to enter a valid AC is less than three. If the number of attempts is less than three, the remote caller is prompted at step 554 to re-enter the AC in accordance with steps 555 and 556. If the number of attempts is greater than or equal to three, then a failure is returned at step 559.

Figure 5E:
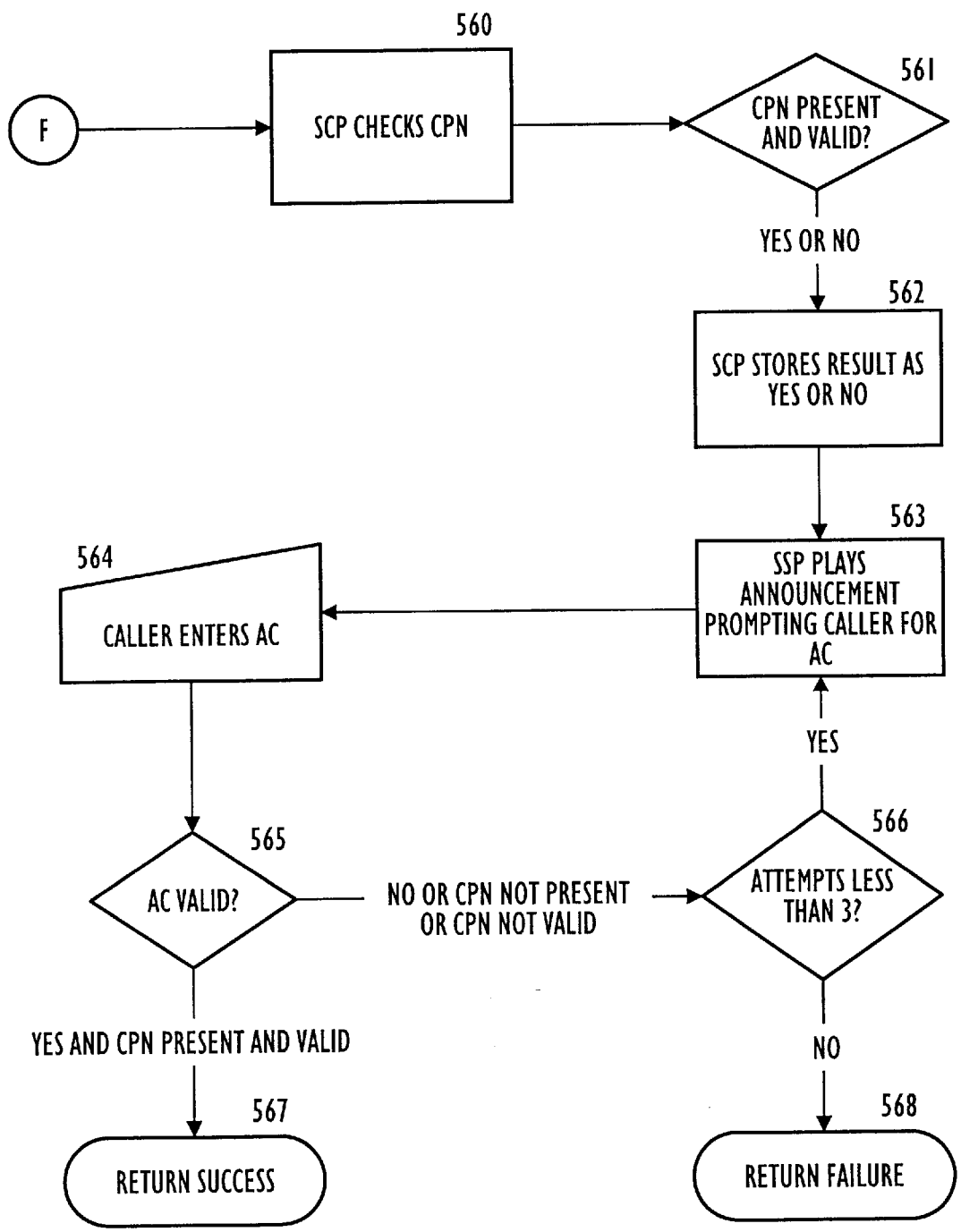

In FIG. 5E, there is shown an exemplary call flow logic for a screening option which requires both a valid AC and CPN. Control passes from point "F" in FIG. 5B to step 560, where the SCP checks the CPN and then determines if the CPN is present and valid at step 561. The SCP validates the CPN at step 561 in accordance with the authorized CPNs (see, for example, FIG. 7). The results of the validation are stored at the SCP at step 562. If the CPN is validated at step 561, i.e., present and an authorized CPN listed in the table of FIG. 7, a "YES" is stored at step 562, otherwise, a "NO" is stored. Step 562 is performed without playing an announcement to the remote caller so that the remote caller will not be able to determine the cause of an authorization failure. Even if the CPN is determined to be not valid, the caller is still prompted for an AC after step 562. As a result, the remote caller will not be able to determine if an invalid CPN or invalid AC was the cause of the authorization failure.

As shown in FIG. 5E, if the CPN is valid, if the CPN is invalid, or if the CPN is not present, control flows to step 563, where the SCP instructs the SSP to play an announcement to prompt the remote caller for an AC. The remote caller enters the AC at step 564, and the SCP validates the AC at step 565 by determining if the entered AC matches one of the ACs on the list of authorized ACs (see, for example, FIGS. 8A and 8B). If the entered AC is valid, and the result stored at step 562 is "YES", then a success is returned at step 567. If the entered AC is invalid, or the result stored at step 562 is "NO", then at step 566, the SCP determines if the number of attempts to enter a valid AC is less than three. If the number of attempts is less than three, the remote caller is prompted at step 563 to re-enter the AC in accordance with steps 564 and 565. If the number of attempts is greater than or equal to three, then a failure is returned at step 568.

Returning again to step 506 in FIG. 5A, if after performing the security screen operation, a failure was returned by the SCP to the CPR, as described with regard to FIGS. 5B–5E, control passes to step 508, where the RAF-SSP will play an announcement to the remote caller to indicate that the call is not authorized, or alternatively to hang up and try the call again.

If after performing the security screen operation at step 506 the result was a success, control flows to step 510, where the remote caller enters a called party telephone number. The exemplary processes that may be performed at step 510 is shown in greater detail with reference to FIG. 9.

As shown in FIG. 9, at step 900, the RAF-SSP provides a dial tone to the remote caller, thus prompting the remote caller to enter the digits of the CDN on the private network at step 902. The SSP collects the CDN and forwards the digits to the SCP at step 904. At step 906, the SCP determines the number of digits entered by the remote caller. If the number of digits is between 10 and 15, the SCP determines that CDN is valid and call processing proceeds to step 908. At step 908, the SCP determines if the first three digits of the dialed number are "011", and if so, returns to the CPR a success and that the call is an international call at step 914. If the SCP determines at step 908 that the first three digits are not "011", then at step 911 the SCP determines if the number of digits is equal to ten, then at step 912 the SCP returns to the CPR a success and that the call is a NANP call. If the SCP determines at step 911 that the number of digits is not equal to ten, then a failure is returned at step 910. The SCP will also return a failure message to the CPR at step 910 when it is determined at step 906 the number of entered digits is not between 10 and 15.

Returning again to step 510 of FIG. 5A, if a failure was returned, the SCP instructs the SSP to play an announcement at step 512 indicating that the call cannot be completed as dialed. If a success was returned at step 510, the processing flow continues at step 514, where the SCP determines the trunk routing as defined by the private network subscriber. The process of determining the trunk routing will be described with greater detail with reference to FIG. 10.

As shown in FIG. 10, the trunk type is determined in accordance with the type of switch serving as the RAF-SSP. As previously indicated, if the switch is a DMS-100 or 5ESS, the valid trunking options are PRI and MF. However, if the switch is a 1AESS switch, the trunking type is MF.

At step 1000, the SCP determines the trunk configuration (MF for 1AESS switches) and ORN/RI by accessing the RAF CPR. As noted above, the subscriber may define a primary trunk group, an alternate trunk group, and a second alternate trunk group to route calls (see, for example, FIG. 3).

At step 1000, the SCP determines the trunk configuration (e.g., MF for 1AESS switches) and ORN/RI by accessing the RAF CPR. As noted above, the subscriber may define a primary trunk group, an alternate trunk group, and a second alternate trunk group to route calls (see, for example, FIG. 3). At step 1000, the SCP determines all of the subscriber predefined routes based on a value different than "00000000" in rows 6, 8 and 10 in the exemplary trigger template shown in FIG. 3. That is, if the ORN/RI is not equal to "00000000", then that possible route is good. The SCP may send all of the predefined routes to the RAF-SSP at one time so that the RAF-SSP can determine an available route. At step 1002, the RAF-SSP determines if the primary trunk group is busy. If the primary trunk group is not busy, the RAF-SSP routes the call through the primary trunk group at step 1004. If the primary trunk is busy, then the RAF-SSP determines if the subscriber has defined an alternate trunk group (as sent by the SCP at step 1000). If no alternate trunk group is defined, then at step 1014 the RAF-SSP plays an announcement that the call cannot be completed, or in the alternative, plays a "fast busy" signal to the remote caller.

If the subscriber has defined an alternate trunk group, then at step 1006, the RAF-SSP determines if the alternate trunk group is busy. If the alternate trunk group is not busy, the RAF-SSP routes the call through the alternate trunk group at step 1008. If the alternate trunk is busy, then the RAF-SSP determines if the subscriber has defined a second alternate trunk group (as sent by the SCP at step 1000). If no second alternate trunk group is defined, then at step 1014 the RAF-SSP plays an announcement that the call cannot be completed, or in the alternative, plays a "fast busy" signal to the remote caller.

If the subscriber has defined a second alternate trunk group, then at step 1010, the RAF-SSP determines if the second alternate trunk group is busy. If the second alternate trunk group is not busy, RAF-SSP routes the call through the second alternate trunk group at step 1012. If the second alternate trunk is busy, then at step 1014, the RAF-SSP plays an announcement that the call cannot be completed, or in the alternative, plays a "fast busy" signal to the remote caller.

Referring again to FIG. 5A, after the trunk routine is determined at step 514, the CPR hands-off the processing to a service measurement operation. The service measurement is performed at the SCP to determine, for example, how much SCP resources are being used by remote access service.

After the call is completed and service measurements are performed at step 516, control is returned to the calling trigger at step 518.

As noted with regard to FIG. 2, when control is returned to the RAF-SSP after the completion of the call, remote access to the private network as facilitated by the present invention is complete.

The present invention advantageously provides a subscriber with a plurality of screening options to authorize off-network remote callers, and trunk routings to terminate calls placed by remote callers to telephone numbers located on the private network. In addition, the advantageous service features of the present invention may be implemented under both AIN Release 0.1 and Release 0.0, thus providing more flexibility.

EXAMPLE SCENARIOS

In order to facilitate a better understanding of the features and aspects of the present invention, two exemplary remote access scenarios are being provided below to described the processes and operations by which a remote caller utilizes the remote access feature of the present invention. The scenarios are described with particular reference to the exemplary network of FIG. 1.

1. Remote Access Using RAF-SSP 13

In scenario 1, the subscriber's private network includes private trunk 311 between PBX 12C and 13C that stations 12D and 13D utilize to call each other. In this scenario, the subscriber allows detached station 17A (i.e., a station not on the private network) to call station 12D. The subscriber has defined private trunk 111 as the primary trunk group, and the screen option as option "1" (CPN only, thus CPN Required).

In accordance with the present invention, a remote caller goes off hook at station 17A and receives dial tone from SSP 17. The remote caller then enters digits for (i.e., calls) the RAF TN 110 at RAF-SSP 13. SSP 13 detects the trigger at the RAF TN 110 and launches a query over SS7 link 43 to the local STP 53. Local STP 53 routes the query to the regional STP 81, which in turn routes the query over SS7 link 91 to SCP (or ISCP) 101. SCP 101 validates the CPN.

Alternatively, if the subscriber's screening options were other than CPN only, the following steps would be either substituted for the step of the SCP validating the CPN (for screening option AC only) or added to the step of the SCP validating the CPN (for screening options CPN and AC, AC if no CPN, and AC if CPN invalid): SCP 101 sends a conversational (i.e., SS7) message to SSP 13 to collect the AC, SSP 13 plays an announcement to the caller and collects the AC from station 17A, SSP 13 sends a message to SCP 101 with the AC, and SCP 101 validates the AC.

In any of the above screening options, once validated, the SCP 101 sends a message through the SS7 network to SSP 13 to collect the called number (CDN) from station 17A. The remote caller is prompted by SSP 13 to enter the CDN of the desired destination and enters the CDN of station 12D. SSP 13 sends a response to SCP 101 with station 12D as the CDN. SCP 101 sends a response to SSP 13 to route the call over private trunk 111 to PBX 13C with station 12D as the CDN. PBX 13C receives the call and connects to PBX 12C (sending station 12D as the CDN) using private trunk 311 and PBX 12C connects the call to station 12D. Stations 17A and 12D are now in communication.

2. Remote Access Using RAF-SSP 15

In scenario 2, the subscriber has a CENTREX on SSP 15 to which station 15A belongs, and a CENTREX on SSP 11 to which station 11A belongs. In addition, the subscriber has a private trunk 121 between the two CENTREXs, which is defined as the primary trunk group. The subscriber also has a private network operated by an IXC. The subscriber's CENTREX on SSP 11 uses private trunk 322 to connect to IXC POP 201, and the subscriber's CENTREX on SSP 15 uses private trunk 122 to connect to the IXC POP 202. IXC POP 201 and IXC POP 202 are connected by private trunk 321. The subscriber's alternate trunk routing is through private trunk 121 to IXC POP 202, over private trunk 321 to IXC POP 201, through private trunk 322 to SSP 11. In this scenario, the subscriber allows a call from detached station 17A to station 11A. The subscriber has defined private trunks 121 as the primary trunk group and private trunk group 122 as the alternate trunk group, and the screening option as option "1" (CPN only, thus requiring CPN Required).

In accordance with the present invention, a remote caller goes off hook at station 17A and receives dial tone from SSP 17. The remote caller then enters digits for (i.e., calls) the RAF TN 120 located at SSP 15. SSP 15 detects the trigger at RAF TN 120, and launches a query over SS7 link 45 to the local STP 53. Local STP 53 routes the query to the regional STP 81, which in turn routes the query over SS7 link 91 to SCP (SCP) 101. SCP 101 validates the CPN.

Alternatively, if the subscriber's screening option was not CPN only, the following steps would be either substituted for the step of the SCP validating the CPN (for screening option AC only) or added to the step of the SCP validating the CPN (for screening options CPN and AC, AC if no CPN, and AC if CPN invalid): SCP 101 sends a conversational (i.e, SS7) message to the SSP 15 to collect the AC, SSP 15 plays an announcement to the caller and collects the AC from station 17A, SSP 15 sends a message SCP 101 with the AC, and SCP 101 validates the AC.

In any of the above screening options, once validated, SCP 101 sends a message through the SS7 network to SSP 15 to collect the called number (CDN) from station 17A. The remote caller next is prompted by SSP 15 to enter the CDN, and enters the desired CDN of station 11A. SSP 15 sends a conversational response to the SCP 101 with station 11A as the CDN. SCP 101 sends a response to SSP 15 to route the call over private trunk 121 as a first choice with station 11A as the CDN, and to route the call over private trunk 122 as a second choice with station 11A as the CDN. SSP 15 routes the call to private trunk 121 with station 11A as the CDN. SSP 11 receives the call on private trunk 121 and connects the call to station 11A. Station 17A and station 11A are now connected to communicate.

If the primary trunk route was busy, the alternate trunk group could have been used. In this case, SSP 15 would have routed the call to private trunk 122 with station 11A as the CDN. IXC POP 202 receives the call on private trunk 122 and connects the call to private trunk 321 with station 11A as the CDN. IXC POP 201 receives the call on private trunk 321 and connects the call to private trunk 322 with station 11A as the CDN. SSP 11 receives a call on private trunk 322 and connects the call to station 11A. Station 17A and station 11A are now connected to communicate.

While the present invention has been described as terminating calls to stations located on the private network, it is possible to configure the private network to include a leaky PBX, such that calls placed on the private network may be leaked off the private network to terminate on detached stations. For example, in scenario 1 described above, station 17A would call RAF TN 110, and once authorized, the call would be routed along private trunk 111 to PBX 13C. The call would then be routed from PBX 13C through private trunk 311 to PBX 12C, which would leak over trunk 25 to SSP 12. From SSP 12, the call from station 17A may be connected to station 12B.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Changes may be made without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A system for facilitating remote access to a private network within an advanced intelligent communications system, said advanced intelligent communications system comprising a service control point, and a two-way communications network interconnecting a plurality of network service switching points and a plurality of non-network service switching points, said two-way communications network selectively establishing communication between at least two of a plurality of geographically dispersed locations coupled to said network and non-network service switching points, said at least two locations including a remote non-network originating station and a network terminating station, said system comprising:

means for receiving, at one of said plurality of network service switching points, a remote access call request from said remote non-network originating station to establish a communication connection with said private network, said one network service switching point comprising means for identifying a service control point request based upon said remote access call request;

means for accessing said service control point in response to said service control point request identified by said identifying means;

means for authorizing, at said service control point, said remote access call request in accordance with at least one of a plurality of predefined screening criteria, said plurality of predefined screening criteria comprising a calling party number of said non-network originating station;

means for collecting, in response to said remote non-network originating station being authorized by said authorizing means, a network terminating number identifying said network terminating station;

means for defining at least one routing path from said one network service switching point to said network terminating station; and means for establishing said communication connection between said non-network originating station and said network terminating station in accordance with said at least one routing path.

2. The remote access system according to claim 1, wherein said authorizing means comprises a calling party number access look-up table including valid calling party numbers.

3. The remote access system according to claim 2, said authorizing means authorizing said remote access call request based on a correlation of said calling party number of said non-network originating station and one of said valid calling party numbers.

4. The remote access system according to claim 1, wherein said screening criteria comprises an authorization code entered by a calling party at said non-network origination station, said authorizing means comprises an authorization code access look-up table including valid authorization codes.

5. The remote access system according to claim 4, said authorizing means authorizing said remote access call request based on a correlation of said authorization code entered by the calling party and one of said valid authorization codes.

6. The remote access system according to claim 1, wherein said plurality of screening criteria comprises a calling party number of said non-network originating station and an authorization code entered by a calling party at said non-network origination station, said authorizing means comprising at least one of a calling party number access look-up table including valid calling party numbers, and an authorization code access look-up table including valid authorization codes.

7. The remote access system according to claim 6, said authorizing means authorizing said remote access call request based on a correlation of said calling party number of said non-network originating station and one of said valid calling party numbers, and a correlation of said authorization code entered by the calling party and one of said valid authorization codes.

8. The remote access system according to claim 6, said authorizing means authorizing said remote access call request based on a correlation of said authorization code entered by the calling party and one of said valid authorization codes when said calling party number of said non-network originating station is not received by said authorizing means.

9. The remote access system according to claim 8, wherein when said authorizing means authorizes said remote access call request, said authorizing means provides an associated calling party number.

10. The remote access system according to claim 6, said authorizing means authorizing said remote access call request based on a correlation of said authorization code entered by the calling party and one of said valid authorization codes when said calling party number of said non-network originating station is not correlated to one of said valid calling party numbers.

11. The remote access system according to claim 10, wherein when said authorizing means authorizes said remote access call request, said authorizing means provides an associated calling party number.

12. The remote access system according to claim 1, said service control point comprising routing information including at least one of a primary trunk group, an alternate trunk group, and a second alternate trunk group, said primary trunk group, said alternate trunk group and said second alternate trunk group comprising routing paths within said private network.

13. The remote access system according to claim 12, said routing path defining means determining said routing path based on said routing information and the availability of said primary trunk group, said alternate trunk group and said second alternate trunk group.

14. The remote access system according to claim 13, said routing information further comprising a trunk signaling type, said trunk signaling type being determined in accordance with at least one of said network service switching points connected to at least one of said primary trunk group, said alternate trunk group and said second alternate trunk group.

15. The remote access system according to claim 1, said service control point comprising means for identifying a protocol of said remote access call request, said authorizing means and said routing path defining means being adapted to authorize and route said remote access call request in accordance with said protocol identified by said identifying means so that a plurality of protocols are compatible with said remote access system.

16. The remote access system according to claim 1, further comprising means for terminating said remote access call request with said private network if said authorizing means does not authorize said remote access call request.

17. The remote access system according to claim 1, said authorizing means further comprising means for evaluating said predefined screening criteria in accordance with combinations of more than one of said predefined screening criteria.

18. The remote access system according to claim 17, said predefined screening criteria comprising at least one of a Calling Party Number Required, a Calling Party Number Not Required, or Calling Party Number Provided.

19. A system for facilitating remote access to a private network within an advanced intelligent communications system said advanced intelligent communications system comprising a plurality of network service switching points, said system selectively establishing communication between a non-network originating station and a network terminating station of said private network, said system comprising:

means for receiving, at one of said network service switching points a remote access call request from said non-network originating station to establish a communication connection with said private network;

means for authorizing said remote access call request in accordance with at least one of a plurality of predefined screening criteria, said plurality of predefined screening criteria comprising a calling party number of said non-network originating station;

means for collecting, in response to said remote access call request being authorized by said authorizing means, a network terminating number identifying said network terminating station;

means for defining a routing path from said one network service switching points to said network terminating station through said private network; and means for establishing said communication connection between said non-network originating station and said network terminating station based on said routing path defined by said routing path defining means.

20. The remote access system according to claim 19, wherein said authorizing means comprises at least one of a calling party number access look-up table including valid calling party numbers.

21. The remote access system according to claim 20, said authorizing means authorizing said remote access call request based on a correlation of said calling party number of said non-network originating station and one of said valid calling party numbers.

22. The remote access system according to claim 19, wherein said screening criteria comprises an authorization code entered by a calling party at said non-network origination station, said authorizing means comprising an authorization code access look-up table including valid authorization codes.

23. The remote access system according to claim 22, said authorizing means authorizing said remote access call request based on a correlation of said authorization code entered by the calling party and one of said valid authorization codes.

24. The remote access system according to claim 19, wherein said plurality of screening criteria comprises a calling party number of said non-network originating station and an authorization code entered by a calling party at said non-network origination station, said authorizing means comprising at least one of a calling party number access look-up table including valid calling party numbers, and an authorization code access look-up table including valid authorization codes.

25. The remote access system according to claim 24, said authorizing means authorizing said remote access call request based on a correlation of said calling party number of said non-network originating station and one of said valid calling party numbers, and a correlation of said authorization code entered by the calling party and one of said valid authorization codes.

26. The remote access system according to claim 24, said authorizing means authorizing said remote access call request based on a correlation of said authorization code entered by the calling party and one of said valid authorization codes when said calling party number of said non-network originating station is not received by said authorizing means.

27. The remote access system according to claim 26, wherein when said authorizing means authorizes said remote access call request, said authorizing means provides an associated calling party number.

28. The remote access system according to claim 24, said authorizing means authorizing said remote access call request based on a correlation of said authorization code entered by the calling party and one of said valid authorization codes when said calling party number of said non-network originating station is not correlated to one of said valid calling party numbers.

29. The remote access system according to claim 28, wherein when said authorizing means authorizes said remote access call request, said authorizing means provides an associated calling party number.

30. The remote access system according to claim 19, said routing path defining means comprising routing information including at least one of a primary trunk group, an alternate trunk group, and a second alternate trunk group, said primary trunk group, said alternate trunk group and said second alternate trunk group comprising routing paths within said private network.

31. The remote access system according to claim 30, said routing path defining means determining said routing path based on said routing information and the availability of said primary trunk group, said alternate trunk group and said second alternate trunk group.

32. The remote access system according to claim 31, said routing information further comprising a trunk signaling type, said trunk signaling type being determined in accordance with at least one of said network service switching points connected to at least one of said primary trunk group, said alternate trunk group and said second alternate trunk group.

33. The remote access system according to claim 19, further comprising means for terminating said remote access call request with said private network when said authorizing means does not authorize said remote access call request.

34. The remote access system according to claim 19, said authorizing means further comprising means for evaluating said predefined screening criteria in accordance with combinations of more than one of said predefined screening criteria.

35. The remote access system according to claim 34, said predefined screening criteria comprising at least one of a Calling Party Number Required, a Calling Party Number Not Required, or Calling Party Number Provided.

36. A system for facilitating remote access to a private network within a communications system, said communications system comprising a service control point, and a two-way communications network interconnecting a plurality of network service switching points and a plurality of non-network service switching points, said two-way communications network selectively establishing a communication connection between at least two of a plurality of geographically dispersed locations coupled to said network and non-network service switching points, said at least two locations including a remote non-network originating station and a network terminating station, said system comprising:

a call request receiving device, said remote access request receiving device receiving at one of said plurality of network service switching points a remote access request from said remote non-network originating station to establish a communication connection with said private network, said one network service switching point identifying a service control point request based upon said remote access request;

an authorization database, said authorization database being accessed by said service control point in response to said service control point request to authorize said remote access request in accordance with at least one of a plurality of screening criteria, said plurality of predefined screening criteria comprising a calling party number of said non-network originating station;

a digit collection device for collecting, in response to the authorization of said remote access request, a network terminating number identifying said network terminating station; and a routing database, said routing database being accessed by said service control point to determine at least one routing path from said one network service switching point to said network terminating station, said communication connection being established in accordance with said at least one routing path.

37. The remote access system according to claim 36, wherein said authorizing means comprises at least one of a calling party number access look-up table including valid calling party numbers.

38. The remote access system according to claim 37, said authorization database authorizing said remote access request based on a correlation of said calling party number of said non-network originating station and one of said valid calling party numbers.

39. The remote access system according to claim 36, wherein said screening criteria comprises an authorization code entered by a calling party at said non-network origination station, said authorizing database comprising an authorization code access look-up table including valid authorization codes.

40. The remote access system according to claim 39, said authorization database authorizing said remote access request based on a correlation of said authorization code entered by the calling party and one of said valid authorization codes.

41. The remote access system according to claim 36, wherein said one screening criteria comprises a calling party number of said non-network originating station and an authorization code entered by a calling party at said non-network origination station, said authorizing database comprising at least one of a calling party number access look-up table including valid calling party numbers, and an authorization code access look-up table including valid authorization codes.

42. The remote access system according to claim 41, said authorization database authorizing said remote access request based on a correlation of said calling party number of said non-network originating station and one of said valid calling party numbers, and a correlation of said authorization code entered by the calling party and one of said valid authorization codes.

43. The remote access system according to claim 41, said authorization database authorizing said remote access request based on a correlation of said authorization code entered by the calling party and one of said valid authorization codes when said calling party number of said non-network originating station is not received by said authorization database.

44. The remote access system according to claim 43, wherein when said authorization database authorizes said remote access request, said authorization database provides an associated calling party number.

45. The remote access system according to claim 41, said authorization database authorizing said remote access request based on a correlation of said authorization code entered by the calling party and one of said valid authorization codes when said calling party number of said non-network originating station is not correlated to one of said valid calling party numbers.

46. The remote access system according to claim 45, wherein when said authorization database authorizes said remote access request, said authorization database provides an associated calling party number.

47. The remote access system according to claim 36, said service control point comprising routing information including at least one of a primary trunk group, an alternate trunk group, and a second alternate trunk group, said primary trunk group, said alternate trunk group and said second alternate trunk group comprising routing paths within said private network.

48. The remote access system according to claim 47, said routing database defining said routing path based on said routing information and the availability of said primary trunk group, said alternate trunk group and said second alternate trunk group.

49. The remote access system according to claim 48, said routing information further comprising a trunk signaling type, said trunk signaling type being determined in accordance with at least one of said network service switching points connected to at least one of said primary trunk group, said alternate trunk group and said second alternate trunk group.

50. The remote access system according to claim 36, said service control point comprising a protocol identifying device to identify a protocol of said remote access request, said authorizing database and said routing path defining database being adapted to authorize and route said remote access request in accordance with said identified protocol so that a plurality of protocols are compatible with said remote access system.

51. The remote access system according to claim 36, further comprising a call termination device, said call termination device terminating said remote access request with said private network if said service control point does not to authorize said remote access request.

52. The remote access system according to claim 36, said authorizing means further comprising means for evaluating said predefined screening criteria in accordance with combinations of more than one of said predefined screening criteria.

53. The remote access system according to claim 36, said predefined screening criteria comprising at least one of a Calling Party Number Required, a Calling Party Number Not Required, or Calling Party Number Provided.

54. In a system for facilitating remote access to a private network within a communications system, said communications system comprising a service control point, and a two-way communications network interconnecting a plurality of network service switching points and a plurality of non-network service switching points, said two-way communications network selectively establishing communication between at least two of a plurality of geographically dispersed locations coupled to said network and non-network service switching points, said at least two locations including a remote non-network originating station and a network terminating station, a method of providing remote access comprising the steps of:

receiving, a remote access request from said remote non-network originating station to establish a communication connection with said private network, said one network service switching point identifying a service control point request based upon said remote access request;

accessing said service control point in response to said service control point request identified by said service control point;

authorizing said remote access request at said service control point in accordance with one of a plurality of predefined screening criteria, said plurality of predefined screening criteria comprising a calling party number of said non-network originating station;

collecting, based on the authorization of said remote access request, a network terminating number identifying said network terminating station, and forwarding said network terminating number to said service control point;

determining, at said service control point, at least one routing path from said network service control point to said network terminating station; and establishing said communication connection between said non-network originating station and said network terminating station in accordance with said at least one routing path.

55. The remote access method according to claim 54, wherein said step of authorizing comprises the step of accessing a calling party number access look-up table including valid calling party numbers.

56. The remote access method according to claim 55, said step of authorizing further comprises correlating said calling party number of said non-network originating station and one of said valid calling party numbers to authorize said remote access request.

57. The remote access method according to claim 54, wherein said screening criteria comprises an authorization code entered by a calling party at said non-network origination station, and said step of authorizing comprises the step of accessing an authorization code access look-up table including valid authorization codes.

58. The remote access method according to claim 57, said step of authorizing further comprises correlating said authorization code entered by the calling party and one of said valid authorization codes to authorize said remote access request.

59. The remote access method according to claim 54, wherein said plurality of screening criteria comprises a calling party number of said non-network originating station and an authorization code entered by a calling party at said non-network origination station, said step of authorizing comprising accessing at least one of a calling party number access look-up table including valid calling party numbers, and an authorization code access look-up table including valid authorization codes.

60. The remote access method according to claim 59, said step of authorizing further comprises the step of correlating said calling party number of said non-network originating station and one of said valid calling party numbers, and correlating an authorization code entered by the calling party and one of said valid authorization codes to authorize said remote access request.

61. The remote access method according to claim 59, said step of authorizing further comprises the step of correlating said authorization code entered by the calling party and one of said valid authorization codes when said calling party number of said non-network originating station is not received by said authorizing means to authorize said remote access request.

62. The remote access method according to claim 61, wherein when said remote access request is authorized, said step of authorizing further comprises providing an associated calling party number.

63. The remote access method according to claim 59, said step of authorizing further comprises the step of correlating of said authorization code entered by the calling party and one of said valid authorization codes when said calling party number of said non-network originating station is not correlated to one of said valid calling party numbers to authorize said remote access request.

64. The remote access method according to claim 63, wherein when said remote access request is authorized, said step of authorizing further comprises providing an associated calling party number.

65. The remote access method according to claim 54, said service control point comprising routing information including at least one of a primary trunk group, an alternate trunk group, and a second alternate trunk group, said primary trunk group, said alternate trunk group and said second alternate trunk group comprising routing paths within said private network.

66. The remote access method according to claim 65, said step of defining a routing path further comprising the step of determining said routing path based on said routing information and the availability of said primary trunk group, said alternate trunk group and said second alternate trunk group.

67. The remote access method according to claim 66, said routing information further comprising a trunk signaling type, said trunk signaling type being determined in accordance with at least one of said network service switching points connected to at least one of said primary trunk group, said alternate trunk group and said second alternate trunk group.

68. The remote access method according to claim 54, further comprising the step of identifying a protocol of said remote access request so that a plurality of protocols are compatible with said remote access method.

69. The remote access method according to claim 54, further comprising the step of terminating said remote access request with said private network when said remote access request is not authorized.

70. The remote access method according to claim 54, said step of authorizing further comprising the step of evaluating said predefined screening criteria in accordance with combinations of more than one of said predefined screening criteria.

71. The remote access method according to claim 70, said predefined screening criteria comprising at least one of a Calling Party Number Required, a Calling Party Number Not Required, or Calling Party Number Provided.

* * * * *